(12) United States Patent
Takata

(10) Patent No.: US 8,721,159 B2
(45) Date of Patent: May 13, 2014

(54) LIGHTING DEVICE, DISPLAY DEVICE AND TELEVISION RECEIVER

(75) Inventor: Yoshiki Takata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 125 days.

(21) Appl. No.: 13/519,636

(22) PCT Filed: Dec. 10, 2010

(86) PCT No.: PCT/JP2010/072202
§ 371 (c)(1),
(2), (4) Date: Jun. 28, 2012

(87) PCT Pub. No.: WO2011/086799
PCT Pub. Date: Jul. 21, 2011

(65) Prior Publication Data
US 2012/0293726 A1 Nov. 22, 2012

(30) Foreign Application Priority Data

Jan. 13, 2010 (JP) .................................. 2010-005179

(51) Int. Cl.
F21V 23/06 (2006.01)
F21V 7/04 (2006.01)
G02F 1/13357 (2006.01)
H01R 12/73 (2011.01)

(52) U.S. Cl.
USPC ........... 362/634; 362/609; 362/612; 362/631; 362/646; 349/65; 439/65

(58) Field of Classification Search
USPC ......... 362/602, 609, 611, 612, 630, 631, 632, 362/633, 634, 646; 439/61, 65; 349/58, 349/61–67; 361/785
See application file for complete search history.

(56) References Cited

U.S. PATENT DOCUMENTS 5,017,146 A * 5/1991 Uehara et al. .................... 439/65
5,727,862 A * 3/1998 Wu ................................. 362/27

(Continued)

FOREIGN PATENT DOCUMENTS

| JP | 11-133394 A | 5/1999 |
| JP | 2008-9047 A | 1/2008 |
| JP | 2008-300147 A | 12/2008 |
| JP | 2009-140685 A | 6/2009 |

OTHER PUBLICATIONS

Official Communication issued in International Patent Application No. PCT/JP2010/072202, mailed on Mar. 8, 2011.

*Primary Examiner* — Alan Cariaso
(74) *Attorney, Agent, or Firm* — Keating & Bennett, LLP

(57) ABSTRACT

To improve a workability in assembling and disassembling of parts of a lighting device. A backlight unit 12 includes an LED board 18 having LEDs 17, a chassis 14, a light guide member 19 having an end portion arranged to face the LEDs 17, a power supply board 21 arranged outside the chassis 14 and supplying drive power to the LEDs 17, and a connector 20 mounted to the chassis 14 and supplying power between the power supply board 21 and the LEDs 17. The connector 20 includes an LED board supporting portion 20a that supports the LED board 18, a power supply board supporting portion 20b having a plate surface along which the power supply board 21 is inserted into and removed from and that supports the inserted power supply board 21, and a connection terminal 28 that comes in contact with the power supply board 21 with allowing relative slide in an inserting and removing direction of the power supply board 21.

29 Claims, 17 Drawing Sheets

(56) References Cited

U.S. PATENT DOCUMENTS 6,962,430 B2 * 11/2005 Ito et al. .................. 362/634
7,434,978 B2 * 10/2008 Chou ....................... 362/631
7,784,990 B2 * 8/2010 Kim ......................... 362/631
8,142,065 B2 * 3/2012 Cho et al. ................. 362/646
8,267,566 B2 * 9/2012 Iwasaki .................... 362/632

* cited by examiner

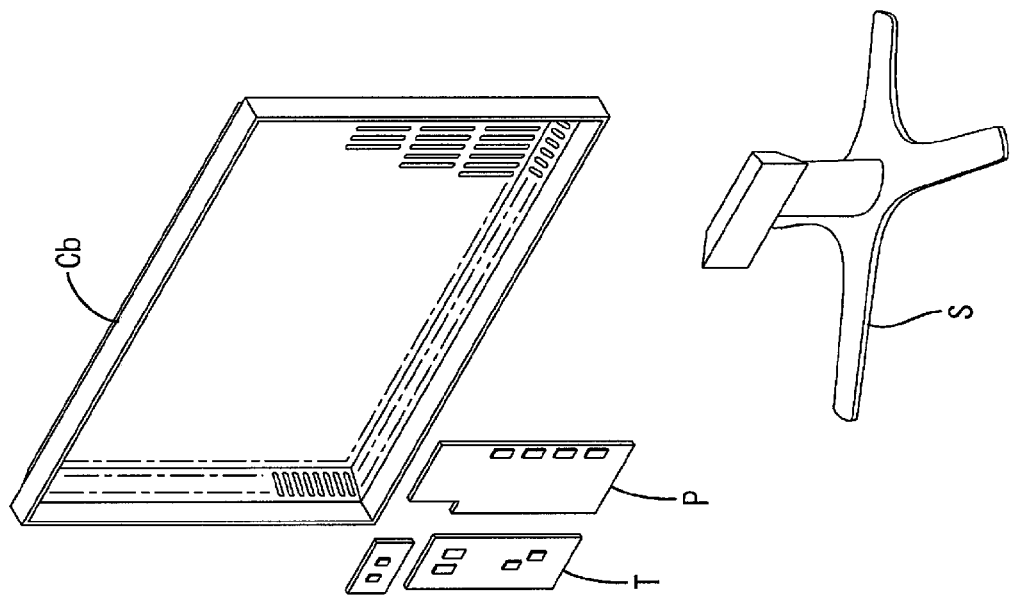
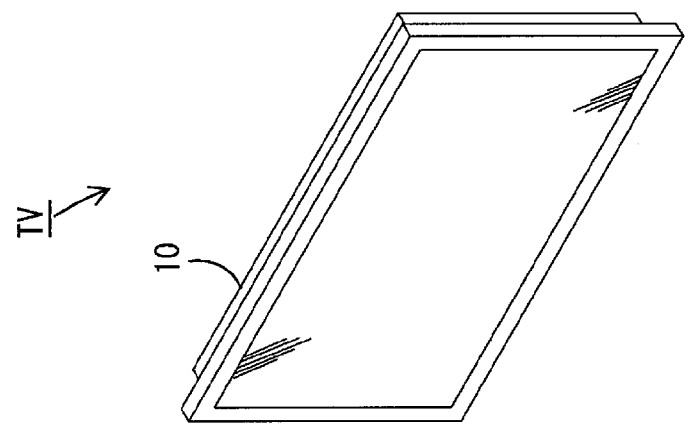
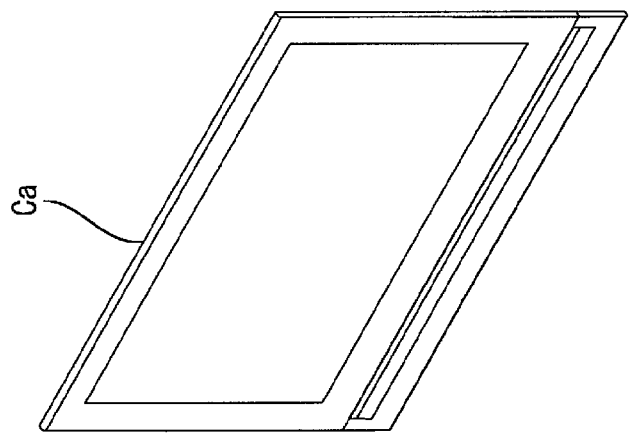
FIG.1

LIGHTING DEVICE, DISPLAY DEVICE AND TELEVISION RECEIVER

TECHNICAL FIELD

The present invention relates to a lighting device, a display device and a television receiver.

BACKGROUND ART

In recent years, a display element of an image display device such as a television receiver is shifting from a conventional Braun tube to a thin display panel such as a liquid crystal panel or a plasma display panel. This enables the image display device to have a reduced thickness. A liquid crystal panel used for a liquid crystal display device does not emit light, and thus a backlight unit is required as a separate lighting device. The backlight unit is broadly classified into a direct type and an edge light type according to its structure. In order to achieve a much thinner structure of the liquid crystal display device, it is preferable to use the edge light type backlight unit, and a structure described in the following Patent Document 1 has been known as one example thereof.

The backlight unit described in the Patent Document 1 is provided with a light guide plate, an LED located opposite to an end portion of the light guide plate, an LED board on which the LED is mounted, and a lead frame that electrically connects the LED board to a power supply board in an external portion. The lead frame is structured such that a clip shaped terminal formed in one end side is soldered to the LED board, and a tabular terminal formed in the other end side is soldered to the power supply board in the external portion, thereby relaying a power supply to the LED board.

Patent Document 1: Japanese Unexamined Patent Publication No. 11-133394

Problem to be Solved by the Invention

However, in the structure described in the Patent Document 1 mentioned above, since mechanical holding and electric connection are achieved by carrying out a soldering work with maintaining the lead frame in a contact state with the LED board and the power supply board at a time of assembling the backlight unit, there has been a problem that an assembling workability is not good. Further, it is hard to carry out a work for detaching the lead frame, the LED board and the power supply board that are fixed to each other by soldering, at a time of disassembling the backlight unit for repairing and disposing of. Therefore, there has been a problem that a detaching workability is not good.

Disclosure of the Present Invention

The present invention is made on the basis of the circumstances as mentioned above, and an object of the present invention is to improve workability in assembling and disassembling.

Means for Solving the Problem

A lighting device according to the present technology includes a light source board on which a light source is arranged, a chassis configured to house the light source board, a light guide member having an end portion and provided such that the end portion faces the light source of the light source board, a power supply board arranged outside the chassis and configured to supply drive power to the light source of the light source board, and a connector mounted to the chassis and configured to connect the power supply board and the light source of the light source board and supply power therebetween. The connector includes a light source board supporting portion, a power supply board supporting portion and a connection terminal. The power supply board is configured to support the light source board, and the power supply board supporting portion has a plate surface along which the power supply board moves to be inserted and removed and configured to support the inserted power supply board. The connection terminal is configured to come in contact with the power supply board such that the power supply board slidably moves to be inserted and removed.

With such a configuration, the light source board accommodated within the chassis is supported by the light source board supporting portion of the connector that is mounted to the chassis. Therefore, the light source is arranged to face the end portion of the light guide member. Accordingly, light from the light source stably enters the light guide member. On the other hand, the power supply board that is arranged outside the chassis is inserted into the power supply board supporting portion of the connector that is mounted to the chassis along the plate surface and this achieves supporting of the power supply board. The connection terminal comes in contact with the power supply board and this supplies power between the light source and the power supply board. The connection terminal is in contact with the power supply board such that the power supply board can relatively slide in its inserting and removing direction. Therefore, it is excellent in workability in assembling and disassembling compared to the conventional case that the lead frame is soldered to the power supply board. In the present technology, the power supply board is inserted to the power supply board supporting portion in assembling, and this achieves mechanical supporting and electrical connection of the power supply board. This improves assembling workability compared to the conventional case. On the other hand, the power supply board is removed from the power supply board supporting portion, and this achieves releasing of mechanical supporting and electrical connection support This improves detaching workability compared to the conventional case.

The following structures are preferable as embodiments in accordance with the present invention.

(1) The power supply board supporting portion may include a power supply board insertion groove configured to receive the power supply board and includes a pair of power supply board supporting wall portions that face each other. With this configuration, if the power supply board is inserted into the power supply board insertion groove of the power supply board supporting portion, the power supply board is sandwiched between the pair of power supply board supporting wall portions and supported therebetween.

(2) The connection terminal may have a contact portion that is configured to come in contact with the power supply board and the contact portion is provided close to one of the power supply board supporting wall portions. With this configuration, if the contact portion of the connection terminal arranged close to the one of the power supply board supporting wall portions is in contact with the power supply board, the power supply board is received by the other one of the power supply board supporting wall portions that is arranged on a side opposite to the connection terminal. This achieves a good contact state.

(3) The connection terminal may have a power supply board elastic contact part that is configured to be in elastic contact with the power supply board. With this configuration, the elastic contact between the power supply board and the power supply board elastic contact part stably maintains mutual connection therebetween.

(4) The power supply board insertion groove may extend and is open in an arrangement direction in which the light source and the light guide member are arranged. With this configuration, the power supply board is inserted to the power supply board insertion groove along the arrangement direction. The light guide member requires to have a certain distance to guide light from the light source therein and this requires the light guide member to have a certain size in the arrangement direction. The arrangement direction matches the insertion direction of the power supply board and this ensures a stroke for inserting the poser supply board.

(5) The power supply board insertion groove may have a power supply board receiving surface on a bottom end of the groove and the power supply board receiving surface may be configured to receive the power supply board. This configuration restricts an inserting depth of the power supply board with respect to the power supply board supporting portion. The power supply board is positioned with respect to the connector in the insertion and removing direction.

(6) The connectors may include a pair of connectors that are arranged so as to be away from each other along a plate surface of the power supply board and in a direction that crosses a direction in which the power supply board is inserted and removed. The power supply board insertion grooves may include a pair of power supply board insertion grooves and the power supply board insertion groove corresponding to one of the pair of connectors is open toward the power supply board insertion groove corresponding to another one of the pair of connectors. If the power supply board insertion groove is configured to be open only to the inserting and removing direction of the power supply board, a partial protruding portion is required to be provided on a portion of the power supply board corresponding to the power supply board insertion groove of the connector. The partial protruding portion may be broken due to a stress concentration. In this regard, in the present technology, each of the power supply board insertion grooves of connectors is configured to be open toward the respective other connector side. Therefore, the partial protruding portion as mentioned above is not required to be provided on the power supply board that is inserted to each of the power supply board insertion grooves of the connectors. In accordance with this, a breakage or the like does not occur in the power supply board.

(7) The chassis may have a bottom portion that is arranged on a side opposite to a light output side with respect to the light source board and the light guide member and to which the connector is mounted, and the power supply board may be arranged such that a plate surface thereof is parallel to the bottom portion. With this configuration, the lighting device becomes thinner in a direction orthogonal to the plate surface of the power supply board.

(8) The bottom portion may have a light guide member support portion configured to support the light guide member, and a connector assembly portion to which the connector is mounted, and the connector assembly portion may be provided on an outer side than the light guide member support portion. With this configuration, the connector assembly portion is structured to protrude to the outer side from the light guide member support portion. This sufficiently secures an installation space for the light source board supporting portion of the connector within the chassis.

(9) The connector may be arranged over a range from the connector assembly portion to the light guide member support portion, and the power supply board supporting portion may be arranged so as to overlap the light guide member support portion. With this configuration, the power supply board supporting portion is arranged so as to overlap the light guide member support portion that is arranged relatively inside with respect to the connector assembly portion. Therefore, the power supply board and the power supply board supporting portion are less likely to protrude to the outer side from the connector assembly portion, whereby the lighting device becomes much thinner in the direction orthogonal to the plate surface of the power supply board.

(10) The power supply board may be arranged in an inner side from an outer end of the connector assembly portion in the direction orthogonal to a plate surface of the power supply board. With this configuration, the power supply board does not protrude further to the outer side from the connector assembly portion. The lighting device becomes thinner with regard to the direction orthogonal to the plate surface of the power supply board.

(11) The light source board supporting portion of the connector may be arranged so as not to overlap the light guide member in a direction orthogonal to a plate surface of the power supply board. With this configuration, it is possible to avoid a mutual interference between the light guide member and the light source board supporting portion of the connector.

(12) The light source board may be configured to be inserted into and removed from the light source board supporting portion along a plate surface thereof, and the light source board supporting portion may include a light source board insertion groove into which the light source board is inserted and include a pair of light source board supporting wall portions that face each other. With this configuration, if the light source board is inserted into the light source board insertion groove of the light source board supporting portion, the light source board is sandwiched by the pair of light source board supporting wall portions to be supported therebetween.

(13) The light source board may be provided with a terminal portion configured to be electrically connected to the light source and come in contact with the connection terminal, and the connection terminal may include a contact portion that is in contact with the terminal portion and provided close to one of the light source board supporting wall portions. With this configuration, if the contact portion of the connection terminal that is arranged close to the one of the light source board supporting wall portions is in contact with the terminal portion, the light source board is received by the other light source board supporting wall portion that is arranged on a side opposite to the connection terminal. This achieves a good contact state.

(14) The light source board insertion groove may have a light source board receiving surface on a bottom end of the groove and the light source board receiving surface receives the light source board. With this configuration, it is possible to regulate an insertion depth of the light source board with respect to the light source board supporting portion and accordingly, the light source board is positioned in the inserting direction with respect to the connector.

(15) The light source board may be configured to be inserted into and removed from the light source board supporting portion along the plate surface thereof, and the connection terminal may be configured to be in contact with the light source board such that the light source board slidably moves to be inserted and removed. With this configuration, the connection terminal comes in contact with the light source board with allowing the light source board to relatively slide in the inserting and removing direction of the light source board. This improves workability in assembling and disassembling compared to the conventional case that the lead frame is soldered to the light source board. In the present technology, the light source board is inserted to the light source board supporting portion in assembling, and this achieves the mechanical supporting and the electrical connection of the light source board. This improves assembling workability compared to the conventional case. On the other hand, the light source board is removed from the light source board supporting portion, and this achieves releasing of the mechanical supporting and the electrical connection. This improves detaching workability compared to the conventional case.

(16) The connection terminal may have a light source board elastic contact part that is configured to come into elastic contact with the terminal portion. With this configuration, the elastic contact between the terminal portion of the light source board and the light source board elastic contact part stably maintains mutual connection therebetween.

(17) The light source board may be provided with a terminal portion that is formed in an elongated shape and is electrically connected to the light source, and the connection terminal may be brought into contact with the terminal portion so as to relatively slide in a long side direction of the light source board. If the light source board expands or contracts in the long side direction due to the thermal expansion or the thermal contraction, a stress acts on the soldered portion and a crack may be generated in the conventional case that the lead frame is soldered to the light source board. However, in the present technology, the connection terminal and the terminal portion can be relatively slid in the long side direction of the light source board with maintaining the contact state with each other. Therefore, contact failures are not caused. Particularly, if the lighting device is increased in size, the light source board tends to be elongated in the long side direction. In connection with it, the amount of expansion or contraction due to the thermal expansion or the thermal contraction is also increased. Therefore, the present technology preferable to be applied to increased size devices.

(18) The terminal portion may be formed relatively wider than the connection terminal in the long side direction of the light source board. With this configuration, the terminal portion is made relatively wider in the long side direction. Therefore, even if the light source board expands or contracts in the long side direction due to the thermal expansion or the thermal contraction and the terminal portion and the connection terminal are relatively slid in the long side direction, the contact state of the connection terminal is effectively maintained. The terminal portion is wide and formed on the elongated light source board. The installation space for the terminal portion is ensured easily without increasing the size of the light source board. On the contrary, the connection terminal of the connector side can be relatively narrower and therefore the connector is not increased in size.

(19) The light source board insertion groove may be configured to be open along a short side direction of the light source board. With this configuration, the light source board is inserted along the short side direction with respect to the light source board supporting portion of the connector.

(20) The light source board insertion groove may be configured to be open along the long side direction of the light source board. With this configuration, the light source board that is inserted in the light source board insertion groove freely expands and contracts in the long side direction. Therefore, it is prevented that the light source board is deformed by a stress caused due to a thermal expansion or a thermal contraction.

(21) The chassis may have an assembling hole through which the connector is mounted to the chassis. With this configuration, the light source board within the chassis can be electrically connected to an external portion via the connector that is mounted to the chassis through the assembling hole so as to communicate inside and outside of the chassis.

(22) The connector may include a connector housing having an insulating property and configured to house the connection terminal therein. With this configuration, it is possible to keep the connection terminal in an insulated state with respect to the chassis or the like by the connector housing.

(23) The connector housing may be made of a synthetic resin, and the connection terminal may be inserted into the connector housing. With this configuration, a manufacturing cost for the connector is reduced.

(24) The lighting device may further include a pair of reflection members. The light source and the end portion of the light guide member that faces the light source may be arranged so as to be spaced from each other with having a space therebetween, and the reflection members may be arranged to sandwich the space therebetween. With this configuration, the light emitted from the light source is repeatedly reflected by the pair of reflection members in the space formed between the reflection members and the respective end portions of the light guide members. Accordingly, the light efficiently enters the end portion of the light guide member. This improves light use efficiency.

(25) The light source may be an LED. This achieves a higher brightness and lower electric power consumption.

Next, in order to achieve the object mentioned above, the display device in accordance with the present technology may be provided with the lighting device described above, and a display panel which carries out a display by utilizing light from the lighting device.

In accordance with the display device mentioned above, the lighting device that supplies light to the display panel is structured to improve workability in assembling and disassembling, and this achieves a cost reduction.

A liquid crystal panel can be exemplified as the display panel. The display device mentioned above can be applied, as a liquid crystal display device, to various intended uses such as a television and a display of a personal computer, and is particularly preferable for a large-size screen.

Advantageous Effect of the Invention

In accordance with the present invention, it is possible to improve workability in assembling and disassembling of components.

BRIEF DESCRIPTION OF THE DRAWINGS

FIG. 1 is an exploded perspective view schematically showing a configuration of a television receiver according to a first embodiment of the present invention;

FIG. 4 is a cross sectional view along a line iv-iv in FIG. 3 and shows a cross sectional structure of an LED board, a chassis, a connector, a power supply board and the like;

BEST MODE FOR CARRYING OUT THE INVENTION

First Embodiment

Figure 3:
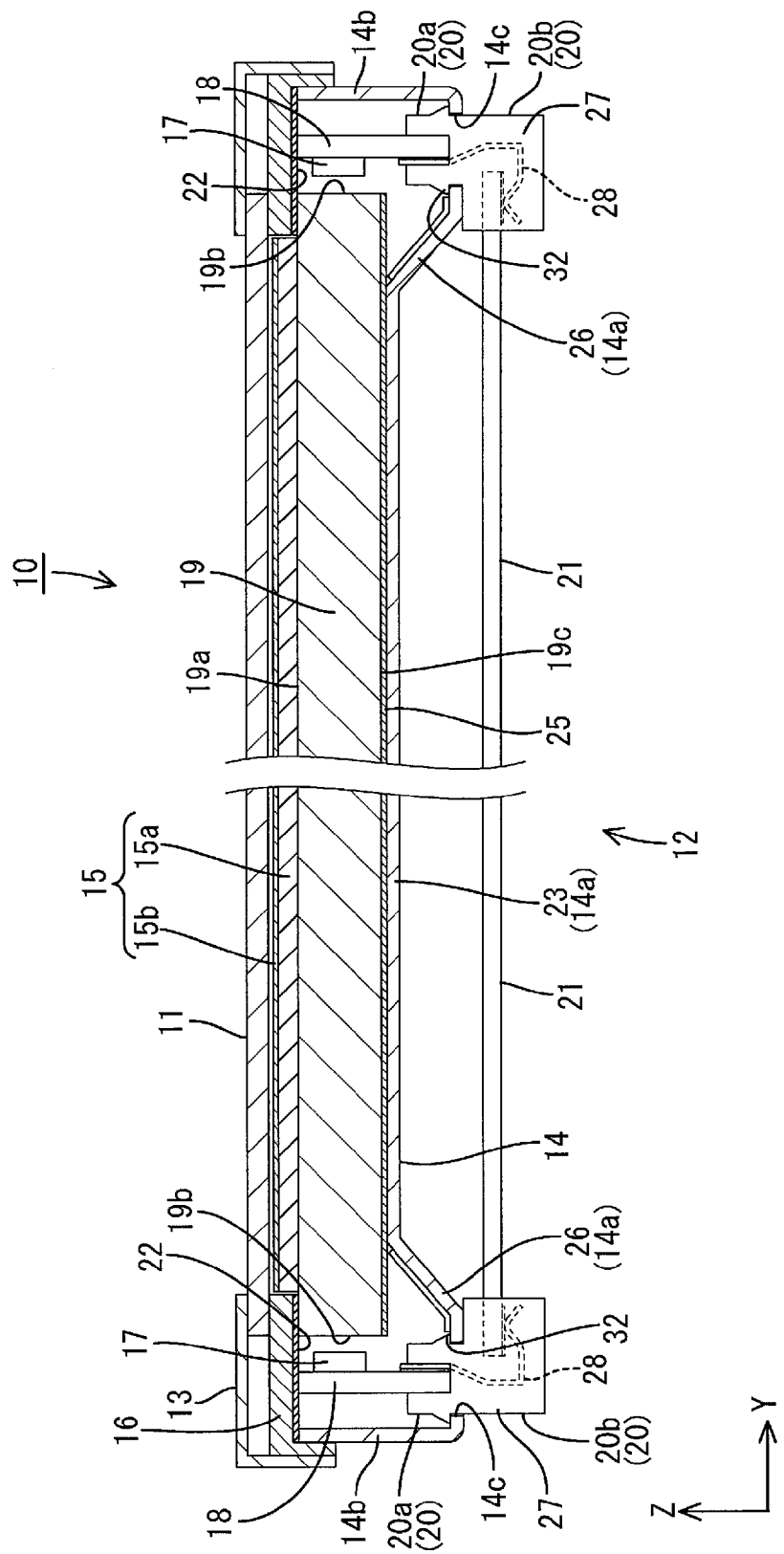
FIG. 3 is a cross sectional view showing a cross sectional configuration along a short side direction of the liquid crystal display device.
Figure 4:
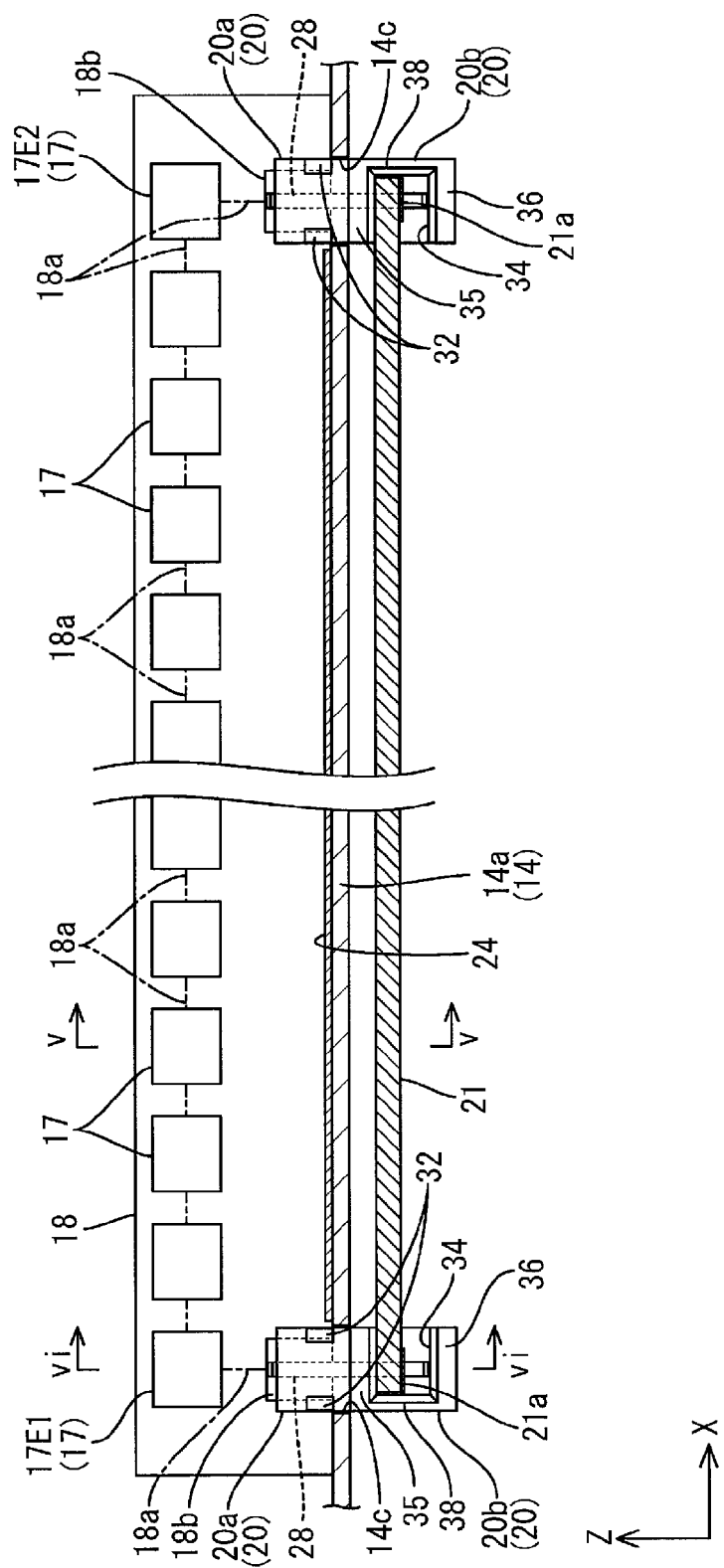

A description will be given of a first embodiment in accordance with the present invention with reference to FIGS. 1 to 8. In the present embodiment, a liquid crystal display device 10 is exemplified. In this case, an X-axis, a Y-axis and a Z-axis are shown in a part of each of the drawings, and each of the axial directions is drawn so as to be a direction shown by each of the drawings. Further, an upper side shown in FIGS. 3 and 4 is set to a front side, and a lower side in the same drawings is set to a back side.

As shown in FIG. 1, a television receiver TV in accordance with the present embodiment is structured so as to be provided with a liquid crystal display device 10, both front and back cabinets Ca and Cb which accommodate the liquid crystal display device 10 in a sandwiching manner, a power source P, a tuner T, and a stand S. The liquid crystal display device (the display device) 10 is formed in a horizontally-long (elongated) square shape (a rectangular shape) as a whole, and is accommodated in a vertically placed state. The liquid crystal display device 10 is provided with a liquid crystal panel 11 corresponding to a display panel, and a backlight unit (a lighting device) 12 corresponding to an external light source, as shown in FIG. 2, and is structured such that they are integrally supported by a frame-like bezel 13 or the like.

Figure 2:
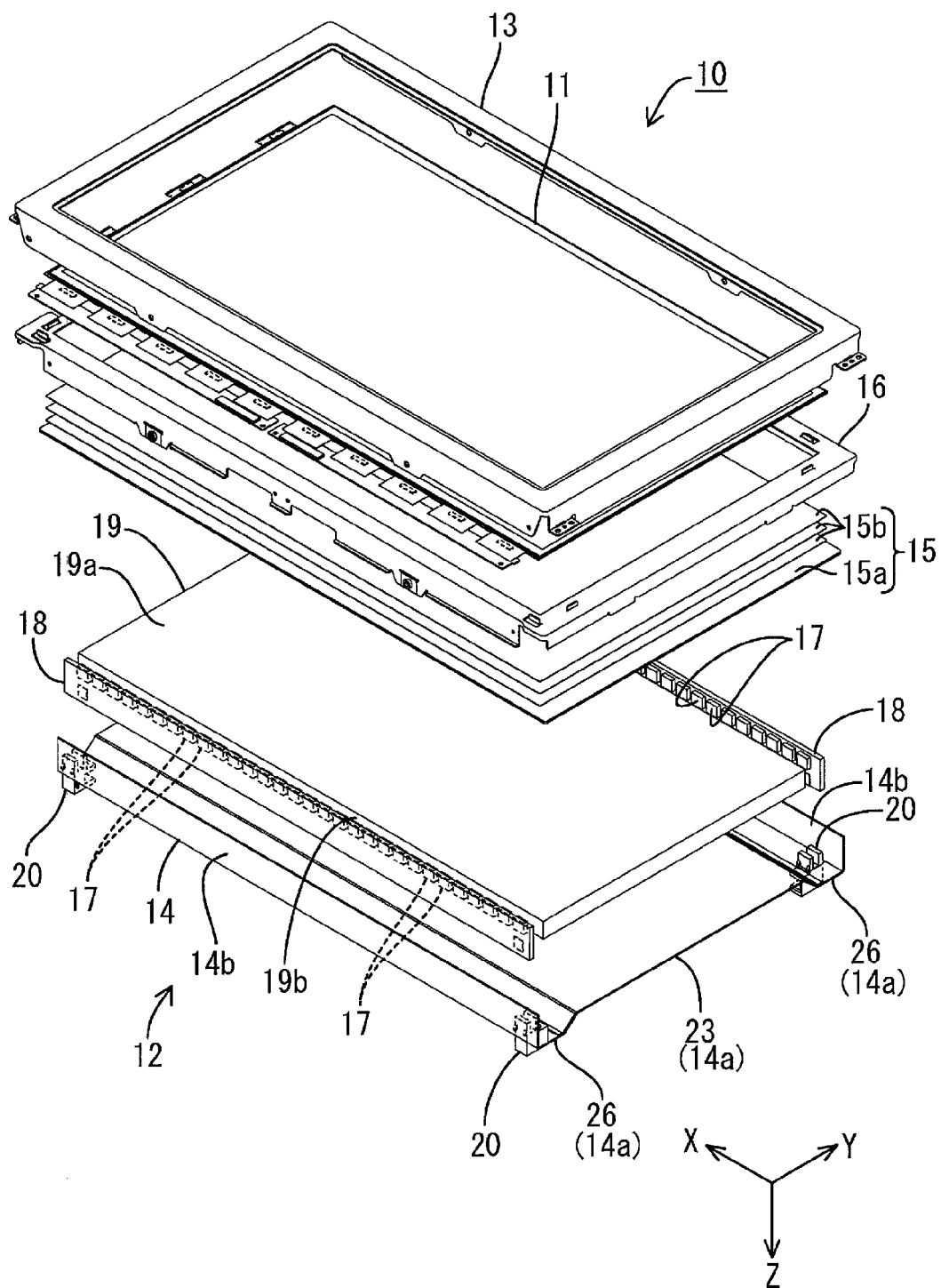
FIG. 2 is an exploded perspective view schematically showing a configuration of a liquid crystal display device included in the television receiver.

The liquid crystal panel 11 is formed in a horizontally-long (elongated) square shape (a rectangular shape) in a plan view, as shown in FIG. 2, and is structured such that a pair of glass substrates is laminated in a state of being spaced at a predetermined gap, and a liquid crystal is sealed between both the glass substrates. One of the glass substrates is provided with a switching component (for example, TFT) which is connected to a source wiring and a gate wiring which are orthogonal to each other, a pixel electrode which is connected to the switching component, an alignment film and the like. The other glass substrate is provided with a color filter or an opposed electrode in which respective color sections of a red color (R), a green color (G), a blue color (B) and the like are arranged in accordance with a predetermined array, the alignment film and the like. In this case, a polarizing plate is arranged in an outer side of both the substrates.

The backlight unit 12 is provided with a chassis 14 which has an opening portion open toward a light output surface side (a liquid crystal panel 11 side) and is formed in a substantially box-like shape, and a group of optical members 15 (a diffuser plate (a light diffusing member) 15a, and a plurality of optical sheets 15b arranged between the diffuser plate 15a and the liquid crystal panel 11) which are arranged so as to cover the opening portion of the chassis 14, as shown in FIG. 2. Further, within the chassis 14, there are provided an LED 17 (Light Emitting Diode) serving as a light source, an LED board 18 on which the LED 17 is mounted, a light guide member 19 which guides the light from the LED 17 so as to guide to the optical member 15 (the liquid crystal panel 11), and a frame 16 which presses the light guide member 19 from a front side. Further, the backlight unit 12 is structured as a so-called edge light type (a side light type) in which the LED board 18 having the LED 17 is provided in each of both end portions in a long side thereof, and the light guide member 19 is arranged in the center side which is located between both the LED boards 18. Further, the backlight unit 12 is provided with a power supply board 21 which is arranged outside the chassis 14 and can supply a drive power of an LED 17 in an LED board 18, and a connector 20 which is assembled in the chassis 14, mechanically supports the LED board 18 and the power supply board 21, and electrically relay connects them. A detailed description will be given below of each of the constituent parts of the backlight unit 12.

The chassis 14 is made of a metal, and is constructed, as shown in FIGS. 2 and 3, by a bottom plate 14a which is formed in a horizontally-long square shape in the same manner as the liquid crystal panel 11, and a pair of side plates 14b respectively rising up from both outer ends close to a long side in the bottom plate 14a. A long side direction of the chassis 14 (the bottom plate 14a) coincides with an X-axis direction (a horizontal direction), and a short side direction coincides with a Y-axis direction (a vertical direction). Further, a pressing member 16 and a bezel 13 can be screwed to the side plate 14b. A detailed description will be given later of a shape of the bottom plate 14a and the like.

The optical member 15 is formed in a horizontally-long square shape in a plan view in the same manner as the liquid crystal panel 11 and the chassis 14, as shown in FIG. 2. The optical member 15 is mounted on a front side (a light output side) of the light guide member 19, and is arranged so as to be interposed between the liquid crystal panel 11 and the light guide member 19. The optical member 15 is constructed by a diffuser plate 15a which is arranged in a back side (a side of the light guide member 19, a side opposite to the light output side), and an optical sheet 15b which is arranged in a front side (a side of the liquid crystal panel 11, the light output side). The diffuser plate 15a is structured such that a lot of diffusing particles are provided by being diffused into a base substrate which has a predetermined thickness, is made of an approximately transparent resin and is formed in a tabular shape, and has a function of diffusing the transmitting light. The optical sheet 15b is formed in a sheet shape thinner than the diffuser plate 15a, and three sheets are laminated and arranged. Examples of a specific kind of the optical sheet 15b include a diffuser sheet, a lens sheet, a reflection type polarizing sheet and the like, and it is possible to appropriately select and use among them.

The frame 16 is formed, as shown in FIG. 2, in a frame shape (a picture frame shape) which extends along an outer peripheral end portion of the light guide member 19, and can press an outer peripheral end portion of the light guide member 19 from a front side over an approximately entire periphery. The frame 16 is made of a synthetic resin, and its surface is, for example, black colored, thereby having a light blocking property. A first reflection sheet 22 reflecting the light is attached to each of the back side surfaces in both the long side portions in the frame 16, that is, a surface opposite to the light guide member 19 and the LED board 18 (the LED 17), as shown in FIG. 3. The first reflection sheet 22 has a magnitude which extends over an approximately entire length in the long side portion of the frame 16, and is structured so as to be directly brought into contact with an end portion close to the LED 17 in the light guide member 19 and collectively cover the end portion of the light guide member 19 and the LED board 18 from the front side. Further, the frame 16 can receive an outer peripheral end portion in the liquid crystal panel 11 from a back side.

Figure 5:
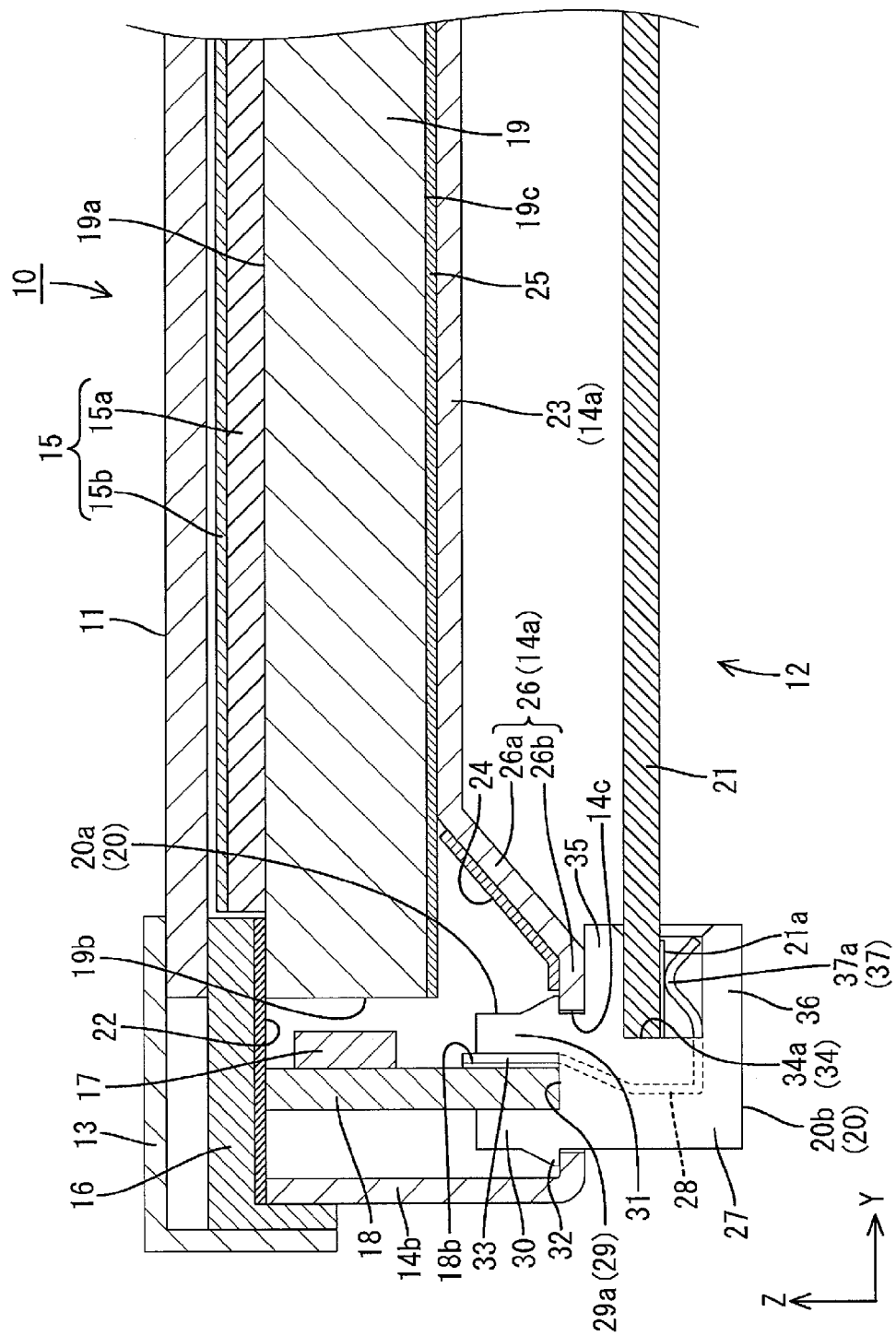
FIG. 5 is a cross sectional view along a line v-v in FIG. 4.

The LED 17 is structured, as shown in FIGS. 2, 3 and 5, such that an LED chip is sealed on a board portion which is firmly fixed to the LED board 18 by a resin material. The LED chip mounted to the board portion employs a structure having one kind of main light emitting wavelength and emitting a single blue light. On the other hand, a fluorescent material which is excited by the blue light emitted from the LED chip and emits a predetermined colored light is dispersion-blended in the resin material which seals the LED chip, and a white light is emitted in general as a whole. In this case, the fluorescent material can be used, for example, by appropriately combining a yellow fluorescent material which emits a yellow light, a green fluorescent material which emits a green light, and a red fluorescent material which emits a red light, or can be used as a single by employing any one of them. The LED 17 is structured, as a so-called top type that a surface opposite to a mounting surface on the LED board 18 serves as a light emitting surface.

The LED board 18 is made of a synthetic resin (an epoxy resin or the like) or a ceramic, is formed in an elongated tabular shape which extends along a long side direction of the chassis 14 (an end portion close to the LED 17 in the light guide member 19), as shown in FIGS. 2 to 4, and is accommodated in the chassis 14 in an attitude that a main plate surface thereof is parallel to the X-axis direction and the Z-axis direction, that is, an attitude that is orthogonal to a plate surface of the liquid crystal panel 11 and the light guide member 19 (the optical member 15). In other words, the LED board 18 is set to an attitude that the long side direction in the main plate surface coincides with the X-axis direction, and the short side direction coincides with the Z-axis direction, respectively, and a thickness direction orthogonal to the main plate surface coincides with the Y-axis direction. A pair of LED boards 18 is arranged at positions which hold the light guide member 19 therebetween in the Y-axis direction, as shown in FIGS. 2 and 3. More particularly, the pair of LED boards 18 is arranged respectively so as to interpose between the light guide member 19 and each of the side plates 14b in the chassis 14, and is structured so as to be accommodated in the chassis 14 from the front side along the Z-axis direction. The LED 17 having the structure mentioned above is surface-mounted onto an inside surface in the main plate surface of the LED board 18, that is, a surface facing the light guide member 19 side (a surface opposite to the light guide member 19). Since the pair of LED boards 18 is accommodated within the chassis 14 in an attitude that the mounting surfaces of the LED 17 are located opposite to each other, the light emitting surfaces of the respective LEDs 17 which are respectively mounted to both the LED boards 18 are located opposite to each other, and the light axes in the respective LEDs 17 approximately coincide with the Y-axis direction. In other words, the respective LEDs 17 mounted to the pair of LED boards 18 are respectively arranged opposite to both the end portions in the light guide member 19. In this case, a raw material used in the LED board 18 may be set to a metal material, for example, the same aluminum material as the chassis 14, and may be structured such that a wiring pattern is formed on a surface thereof via an insulating layer.

A plurality of (thirty in FIG. 2) LEDs 17 are arranged parallel to each other in a liner (linearly) along the long side direction (the X-axis direction) on the mounting surface of the LED board 18, as shown in FIGS. 2 and 4. In the LED board 18, this group of LEDs 17 is arranged eccentrically so as to be close to one end in the short side direction (close to a side opposite to a terminal portion 18b to be mentioned later), specifically close to an end portion in the frame 16 side (the side of the liquid crystal panel 11, the front side). In the LED board 18, as shown in FIG. 4, there is formed a wiring pattern 18a which transverses the mounted group of LEDs 17, connects in series the LEDs 17 adjacent to each other, and is constructed by a metal film (a copper foil or the like). In detail, the wiring pattern 18a is structured so as to linearly transverse between an LED 17E1 which is positioned at one end in the long side direction in the LED board 18, and an LED 17E2 which is positioned at the other end, along the long side direction, and electrically connects all the mounted LEDs 17 to each other. Further, a pair of terminal portions (lands) 18b respectively connected to a connector 20 is formed in the vicinity of both end portions in the long side direction, in the LED board 18. Subsequently, a description will be given in detail of the terminal portion 18b. In the following description, in the case of distinguishing the LED 17, a suffix "E1" is attached to reference numeral of the LED which is positioned in a left end shown in FIG. 4, and a suffix "E2" is attached to reference numeral of the LED which is positioned in a right end in the same drawing, respectively. In the case of generically naming without distinguishing, the suffix is not attached. Further, in FIG. 4, the wiring pattern 18a is illustrated by a single-dot chain line.

The terminal portion 18b is constructed by the metal film in the same manner as the wiring pattern 18a, is formed in a square shape (a quadrangular shape) in a front view, and has a predetermined area (an area which is slightly smaller than the LED 17) in a surface of the main plate surface of the LED board 18, as shown in FIG. 4. The terminal portion 18b is arranged at a position relatively deviating in the Z-axis direction with respect to the LED 17, that is, the short side direction of the LED board 18 (a spaced position). In detail, the terminal portions 18b are respectively arranged at the positions which are parallel in the Z-axis direction while being spaced at a predetermined distance with respect to each of the LEDs 17E1 and 17E2 which are positioned at both ends in the long side direction in the LED board 18. The respective terminal portions 18b are electrically connected to the respective LEDs 17E1 and 17E2 which are positioned at both ends in the long side direction in the LED board 18 by the wiring pattern 18a. A portion connecting the terminal portion 18b and the LEDs 17E1 and 17E2 in the wiring pattern 18a is formed in a linear shape along the Z-axis direction, and a length thereof coincides with a distance between the terminal portion 18b and the LEDs 17E1 and 17E2. The terminal portion 18b is arranged eccentrically so as to be close to the other end in the short side direction (the Z-axis direction) (close to a side opposite to the LED 17 side), in the LED board 18, and is particularly arranged in an end portion close to the bottom plate 14a of the chassis 14 (the connector 20 side, the back side), in the LED board 18. In this case, the wiring pattern 18a and the terminal portion 18b are both formed on the mounting surface of the LED 17 in the LED board 18. Therefore, the LED board 18 in accordance with the present embodiment is of a single-sided type that only one surface of the main plate surface is set to the mounting surface.

The light guide member 19 is made of a synthetic resin material (for example, an acrylic or the like) which has a sufficiently higher refraction factor than air and is approximately transparent (excellent in light transmission). The light guide member 19 is formed in a tabular shape which is a horizontally-long square shape in a plan view in the same manner as the liquid crystal panel 11 and the chassis 14, as shown in FIG. 2, a long side direction in the main plate surface coincides with the X-axis direction, and a short side direction coincides with the Y-axis direction, respectively, and a thickness direction orthogonal to the main plate surface coincides with the Z-axis direction. The light guide member 19 is arranged at a position which is just below the liquid crystal panel 11 and the optical member 15 within the chassis 14, as shown in FIG. 3, and is arranged so as to be sandwiched between the pair of LED boards 18 arranged in both end portions in the side of the long side in the chassis 14 with regard to the Y-axis direction. Therefore, the arranging direction of the LED 17 (the LED board 18) and the light guide member 19 coincides with the Y-axis direction, and the arranging direction of the optical member 15 (the liquid crystal panel 11) and the light guide member 19 coincides with the Z-axis direction, whereby both the arranging directions are orthogonal to each other. Further, the light guide member 19 has a function of introducing the light which is emitted from the LED 17 toward the Y-axis direction, and raising and outputting the light so as to head for the optical member 15 side (the Z-axis direction) while propagating in the inner portion. Since the light guide member 19 is arranged at the center position in the short side direction in the bottom plate 14a of the chassis 14, the center portion in the short side direction in the bottom plate 14a is set to a light guide member support portion 23 which supports the light guide member 19 from a back side. In this case, the size of the light guide member 19 is set to be larger than that of the optical member 15 mentioned above, and is structured such that an outer peripheral end portion thereof protrudes to an outer side than an outer peripheral end surface of the optical member 15 and is pressed by the flame 16 mentioned above (FIG. 3).

The surface facing the front side in the main plate surface of the light guide member 19 comes to a light output surface 19a which outputs the light in the inner portion toward the optical member 15 and the liquid crystal panel 11, as shown in FIG. 3. Both end surfaces close to the long side forming the elongated shape along the X-axis direction in the adjacent outer peripheral end surfaces with respect to the main plate surface in the light guide member 19 are respectively formed so as to be located opposite to each other while being spaced at a predetermined distance from the LED 17 (the LED board 18), and they come to a light incident surface 19b to which the light emitted from the LED 17 is input. The first reflection sheet 22 mentioned above is arranged in a front side of the space which is kept between the LED 17 and the light incident surface 19b, as shown in FIG. 5, and a second reflection sheet 24 is arranged in a back side of the space, so as to sandwich the space with respect to the first reflection sheet 22. Both the reflection sheets 22 and 24 are arranged so as to sandwich the end portion close to the LED 17 in the light guide member 19 and the LED 17, in addition to the space mentioned above. In accordance with this, it is possible to efficiently input to the light incident surface 19b by repeatedly reflecting the light from the LED 17 between both the reflection sheets 22 and 24. Further, the light incident surface 19b is set to a surface which is parallel along the X-axis direction and the Z-axis direction (the main plate surface of the LED board 18), and is set to a surface which is approximately orthogonal to the light output surface 19a. Further, the arranging direction of the LED 17 and the light incident surface 19b coincides with the Y-axis direction, and is parallel to the light output surface 19a.

A surface 19c in a side opposite to the light output surface 19a in the light guide member 19 is provided with a light guide reflection sheet 25 which can reflect and raise the light within the light guide member 19 to the front side so as to cover an entire region. In this case, a reflection portion (not illustrated) reflecting the light in the inner portion or a scatter portion (not illustrated) scattering the light in the inner portion is patterned at least in any one of the light output surface 19a and the surface 19c in the side opposite thereto in the light guide member 19 so as to have a predetermined in-plane distribution, whereby the light output from the light output surface 19a is controlled so as to have a uniform distribution within the surface.

The power supply board 21 is structured such that a predetermined wiring pattern (not shown) is formed on a base member made of a synthetic resin (an epoxy resin or the like) and various electronic parts are mounted, and is connected to a power source P of the liquid crystal display device 10. The power supply board 21 is arranged in a back side outer portion of the bottom plate 14a of the chassis 14 so as to be opposite thereto, as shown in FIG. 3, and a pair of the power supply boards 21 is approximately symmetrically arranged at positions of both ends in a long side direction in the bottom plate 14a. The power supply board 21 is arranged such that a plate surface is parallel to the plate surface of the bottom plate 14a, is formed in a square shape which is horizontally-long in a plan view, and is arranged in a direction in which the long side direction coincides with a short side direction (a Y-axis direction) of the bottom plate 14a and the short side direction coincides with a long side direction (an X-axis direction) of the bottom plate 14a. In the power supply board 21, a terminal portion 21a which is connected to the wiring pattern is formed in an end portion in an end side in the short side direction of the bottom plate 14a, that is, an end portion in the connector 20 side to be mentioned next. A pair of the terminal portions 21a is arranged at positions which superpose with the connector 20 in the power supply board 21 in the assembled state in the plan view, as shown in FIGS. 3 and 4, that is, in the end portions in the outer side in the short side direction (the Y-axis direction) of the bottom plate 14a in the power supply board 21 and in both side end portions in the X-axis direction.

Subsequently, a description will be given in detail of the connector 20. A pair of connectors 20 is arranged in the vicinity of both end portions in the long side direction in the chassis 14, in correspondence to the pair of terminal portions 18b arranged in the vicinity of both end portions in the long side direction in each of the LED boards 18, as shown in FIGS. 2 and 4. The connector 20 is supported in a state of passing through the bottom plate 14a inside and outside, by being assembled in an assembling hole 14c which is formed in the bottom plate 14a of the chassis 14, as shown in FIG. 3. In the connector 20, a portion which protrudes into the chassis 14 is formed as an LED board supporting portion 20a which can support the LED board 18, and a portion which protrudes outward of the chassis 14 is formed as a power supply board supporting portion 20b which can support an external power supply board 21. Among them, a protruding leading end portion into the chassis 14 in the LED board supporting portion 20a is arranged at a position which is lower than the light guide member 19, that is, a position deviating from the light guide member 19 in a Z-axis direction (a direction orthogonal to the plate surface of the power supply board 21, and the inserting and drawing direction of the LED board 18), thereby avoiding a matter that it interferes with the light guide member 19. Since the pair of connectors 20 is arranged in the vicinity of each of both end positions in the short side direction in the bottom plate 14a of the chassis 14, both end portions in the short side direction except the light guide member support portion 23 in the bottom plate 14a are set to be a connector assembling portion 26 in which the connector 20 is assembled. The connector assembling portion 26 includes a rising portion 26a which rises from the light guide member support portion 23 toward a back side and is formed in an inclined shape, and an outer end portion 26b which protrudes outward along the Y-axis direction from a rising end of the rising portion 26a. The outer end portion 26b has an assembling hole 14c, is parallel to the light guide member support portion 23, and is structured such that the side plate 14b rises from an outer end thereof. A pair of assembling holes 14c is formed in the vicinity of both the end portions in the X-axis direction in the outer end portion 26b (FIG. 4). Further, the second reflection sheet 24 mentioned above is arranged along an inner surface of the connector assembling portion 26, and is arranged in a range from the rising portion 26a to the outer end portion 26b (FIG. 5).

Figure 6:
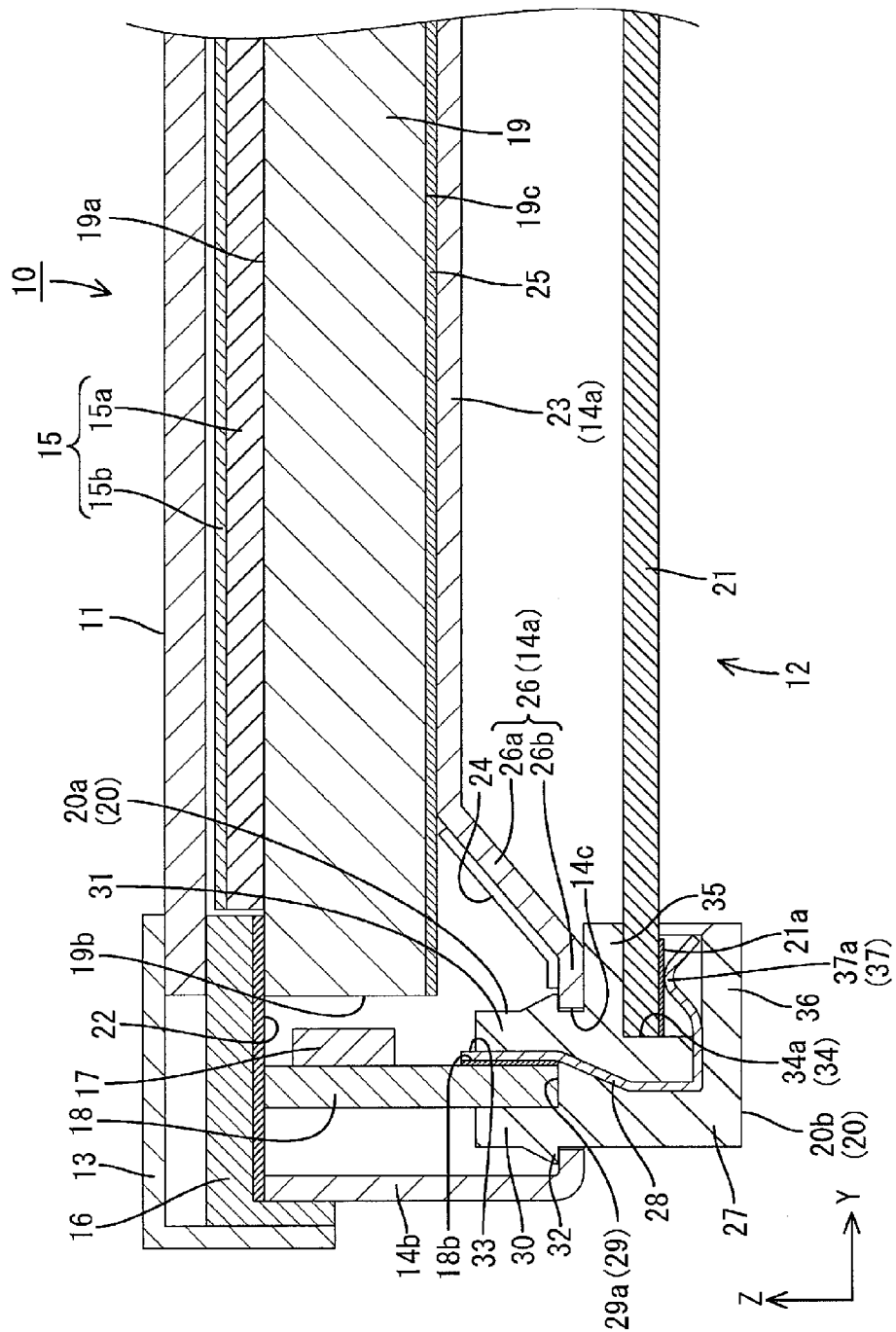
FIG. 6 is a cross sectional view along a line vi-vi in FIG. 4.

The connector 20 is constructed by a connector housing 27, and a connection terminal 28 which is inserted (embedded) into the connector housing 27, as shown in FIG. 6. The connector housing 27 is made of a synthetic resin having an insulating property, is formed as an approximately L-shaped cross sectional form as a whole, and is structured such that one end side which is arranged within the chassis 14 constructs the LED board supporting portion 20a and can support the LED board 18, and the other end side which is arranged outside the chassis 14 constructs the power supply board supporting portion 20a and can support the power supply board 21. The connection terminal 28 is made of a metal which is excellent in conductivity, is formed in a shape which approximately copies the connector housing 27, that is, an approximately L-shaped cross sectional form, and is structured such that one end side which is arranged within the chassis 14 constructs the LED board supporting portion 20a and can come into contact with the terminal portion 18b of the LED board 18, and the other end side which is arranged outside the chassis 14 constructs the power supply board supporting portion 20a and can come into contact with the terminal portion 21a of the power supply board 21.

A pair of LED board supporting wall portions 30 and 31 located opposite to each other and holding an LED board insertion groove 29 which the LED board 18 can be inserted into and drawn from along a plate surface thereof (a Z-axis direction) is formed in a portion which is arranged within the chassis 14, that is, a portion which constructs the LED board supporting portion 20a, in the connector housing 27. The LED board insertion groove 29 is structured so as to be open toward a front side along the Z-axis direction (the short side direction of the LED board 18) and be open to both sides along the X-axis direction (the long side direction of the LED board 18) (FIG. 4). Further, an LED board receiving surface 29a which receives the inserted LED board 18 is formed in a far end of the LED board insertion groove 29, whereby it is possible to regulate an insertion depth of the LED board 18. Accordingly, it is possible to keep a positional relationship between the LED board 18 and the connector 20 at a constant level in the Z-axis direction.

The pair of LED board supporting wall portions 30 and 31 is arranged so as to sandwich the LED board 18 which is inserted into the LED board insertion groove 29 from both sides in the Y-axis direction, and is constructed by an outer supporting wall portion 30 which is arranged in an outer side (the side plate 14b side) in the short side direction in the chassis 14, with respect to the LED board 18, and an inner supporting wall portion 31 which is arranged in an inner side (the light guide member 19 side) in the short side direction. Among them, the outer supporting wall portion 30 comes into contact with a surface in a side opposite to a mounting surface of the LED 17 and the terminal portion 18b in a main plate surface of the LED board 18 and can be supported. On the other hand, the inner supporting wall portion 31 is arranged at a position opposite to the mounting surface of the LED 17 and the terminal portion 18b in the main plate surface of the LED board 18, while having a slight distance (a distance of about a thickness of an LED board contact part 33 to be mentioned next) formed between itself and this mounting surface. Further, the LED board contact part 33 which is brought into contact with the terminal portion 18b of the LED board 18 in the connection terminal 28 is arranged in the inner supporting wall portion 31 side among the pair of LED board supporting wall portions 30 and 31. The LED board contact part 33 constructs the LED board supporting portion 20a in the connector 20. The LED board contact part 33 is structured so as to extend along an inner wall surface of the inner supporting wall portion 31, and is arranged such that a predetermined distance (a distance of about the thickness of the LED board 18 including the terminal portion 18b) is formed with respect to the outer supporting wall portion 30 located opposite thereto. In the LED board contact part 33, a leading end portion protrudes to a further front side than both the LED board supporting wall portions 30 and 31. The protruding portion from both the LED board supporting wall portions 30 and 31 in the LED board contact part 33 can be soldered, for example, in a state in which the LED board 18 is inserted into the LED board insertion groove 29, whereby it is possible to fix the terminal portion 18b and the LED board contact part 33 in a contact state. In this case, in the LED board 18 which is inserted into the LED board insertion groove 29, the other end portion in the short side direction, that is, the end portion in which the terminal portion 18b is arranged is supported between both the LED board supporting wall portions 30 and 31. Further, a pair of supporting projections 32 which can support the connector 20 in a state of preventing the connector 20 from coming off from the chassis 14 by locking to an edge portion of the assembly hole 14c of the chassis 14 is formed on outer surfaces of both the LED board supporting wall portions 30 and 31.

On the other hand, in a portion which protrudes outward of the chassis 14, that is, a portion which constructs the power supply board supporting portion 20b in the connector housing 27, there is formed a power supply board insertion groove 34 which the power supply board 21 can be inserted into and drawn from along the plate surface (the Y-axis direction), as shown in FIGS. 4 and 6. The power supply board insertion groove 34 is structured so as to be open toward a center side in the short side direction of the bottom plate 14 along the Y-axis direction (the short side direction of the power supply board 21, the arranging direction of the LED 17 and the light guide member 19), and be open to a center side in the long side direction of the bottom plate 14 along the X-axis direction (the long side direction of the power supply board 21), that is, toward the another connector 20 side (FIG. 4). In accordance with this, both end portions of the power supply board 21 can be inserted into and drawn from each of the power supply board insertion grooves 34 of the pair of connectors 20 without forming a partial protruding position in both end portions in the long side direction. Further, a power supply board receiving surface 34a which receives the inserted power supply board 21 is formed in a far end of the power supply board insertion groove 34, whereby it is possible to regulate an insertion depth of the power supply board 21. Accordingly, it is possible to keep a positional relationship between the power supply board 21 and the connector 20 at a constant level in the Y-axis direction.

A pair of power supply board supporting wall portions 35 and 36 located opposite to each other and holding the power supply board insertion groove 34 is formed in the constituent position of the power supply board supporting portion 20b in the connector housing 27. The pair of power supply board supporting wall portions 35 and 36 is arranged so as to sandwich the power supply board 21 which is inserted into the power supply board insertion groove 34 from both front and back sides in the Z-axis direction, and is constructed by a front side supporting wall portion 35 which is arranged in a front side, and aback side supporting wall portion 36 which is arranged in a back side with respect to the power supply board 21. Among them, the front side supporting wall portion 35 comes into contact with a surface in a side opposite to a forming surface of the terminal portion 21a in a main plate surface of the power supply board 21 and can be supported. On the other hand, the back side supporting wall portion 36 is arranged at a position opposite to the forming surface of the terminal portion 21a in the main plate surface of the power supply board 21 while having a predetermined distance formed between itself and this forming surface. Further, a power supply board elastic contact part 37 which is brought into contact with the terminal portion 21a of the power supply board 21 in the connection terminal 28 is arranged in the back side supporting wall portion 36 side among the pair of power supply board supporting wall portions 35 and 36. The power supply board contact part 37 constructs the power supply board supporting portion 20b in the connector 20.

Figure 8:
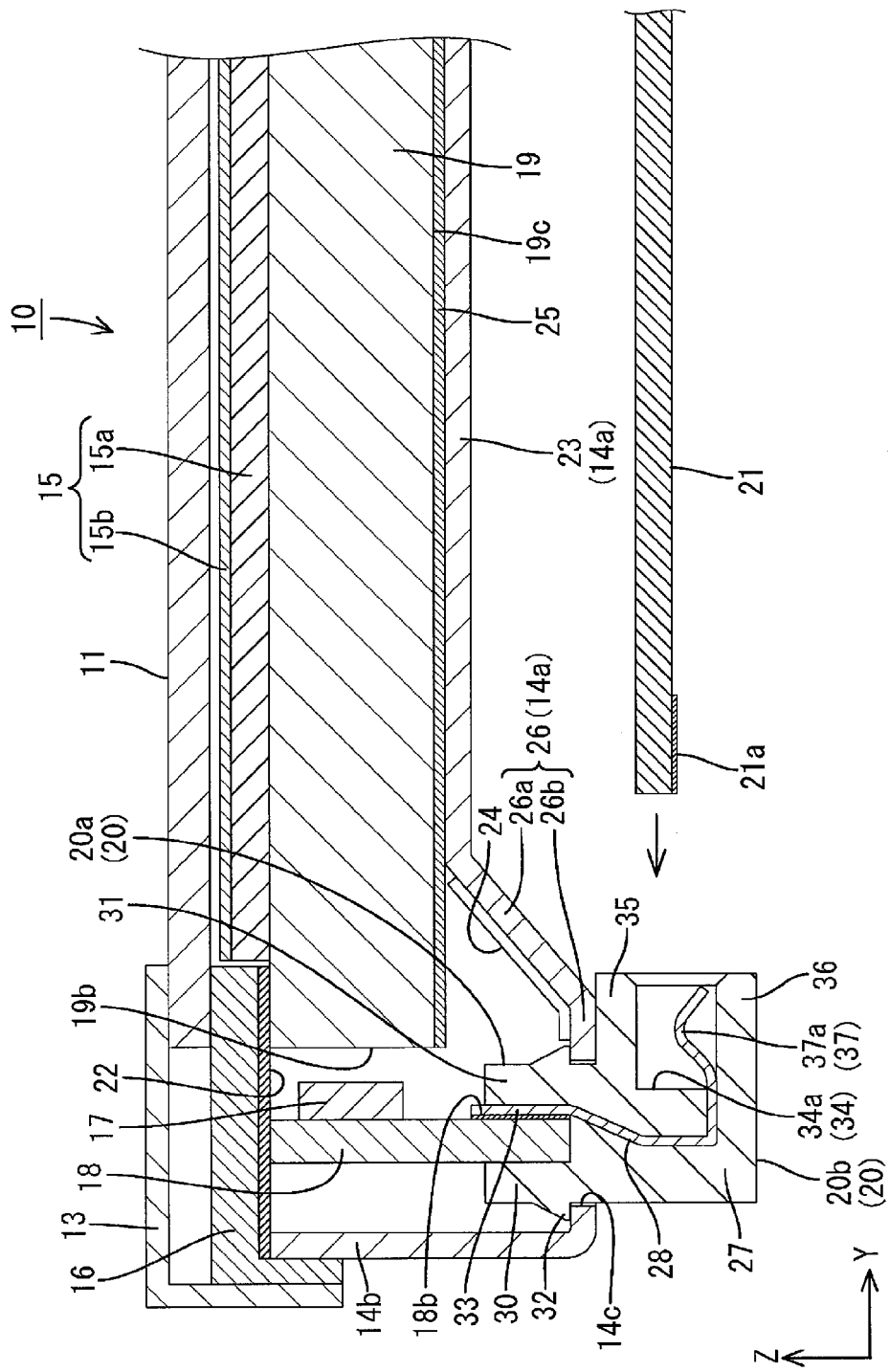
FIG. 8 is a cross sectional view along the line vi-vi in FIG. 4 and shows a state before the power supply board is inserted into the connector.

The power supply board elastic contact part 37 is arranged so as to be exposed into the power supply board insertion groove 34 by protruding from the back side supporting wall portion 36 side in the connector housing 27 toward the front side supporting wall portion 35 side, that is, toward the inserted power supply board 21 side, and a cross sectional shape thereof is formed as an approximately V-shaped form. The power supply board elastic contact part 37 can be elastically deformed around a protruding base end portion from the back side supporting wall portion 36 as a supporting point. In the power supply board elastic contact part 37, a protruding leading end portion to the power supply board 21 side is set to a contact point 37a with respect to the terminal portion 21a. The contact point 37a is arranged at a position in which a distance held with respect to the front side supporting wall portion 35 becomes smaller than a thickness of the power supply board 21 including the terminal portion 21a in a state before inserting the power supply board 21 (FIG. 8). Accordingly, if the power supply board 21 is inserted into the power supply board insertion groove 34, the power supply board elastic contact part 37 is structured so as to be elastically deformed while opening in conjunction with a contact of the contact point 37a with the terminal portion 21a. In accordance with this, on the basis of a snapping force applied from the power supply board elastic contact part 37, it is possible to mechanically support the power supply board 21 with respect to the front side supporting wall portion 35, and it is possible to keep the power supply board elastic contact part 37 with respect to the terminal portion 21a at a predetermined contact pressure.

As mentioned above, the power supply board elastic contact part 37 of the connection terminal 28 is structured such that the electric contact state is maintained, by being elastically brought into contact with the terminal portion 21a of the power supply board 21, and is not fixed by soldering or the like as is different from the conventional one. In other words, it can be said that the connection terminal 28 in accordance with the present embodiment is brought into contact with the terminal portion 21a of the power supply board 21 in a state in which a relative slide is allowed in the inserting and drawing direction (the Y-axis direction) of the power supply board 21. Accordingly, if the work for inserting the power supply board 21 with respect to the power supply board insertion groove 34 of the connector 20 is carried out, it is possible to achieve both the mechanical retention and the electrical connection. On the contrary, if the work for drawing the power supply board 21 from the power supply board insertion groove 34 of the connector 20 is carried out, it is possible to release both the mechanical retention and the electrical connection. Further, the power supply board 21 is arranged at a position which is more protruded toward the back side than the connector assembly portion 26 in the bottom plate 14a, in a state of being inserted into the power supply board insertion groove 34 (FIG. 6). Further, among both the power supply board retention wall portions 35 and 36, the end portions in the end sides in the long side direction of the bottom plate 14 are connected to each other by the connection wall portion 38 (FIG. 4).

The present embodiment is structured as mentioned above, and a description will be given subsequently of an operation thereof. In order to manufacture the liquid crystal display device 10, the liquid crystal panel 11, the backlight unit 12 and the bezel 13 are assembled, each of which is independently manufactured. A description will be given below of a manufacturing procedure of the liquid crystal display device 10.

Figure 7:
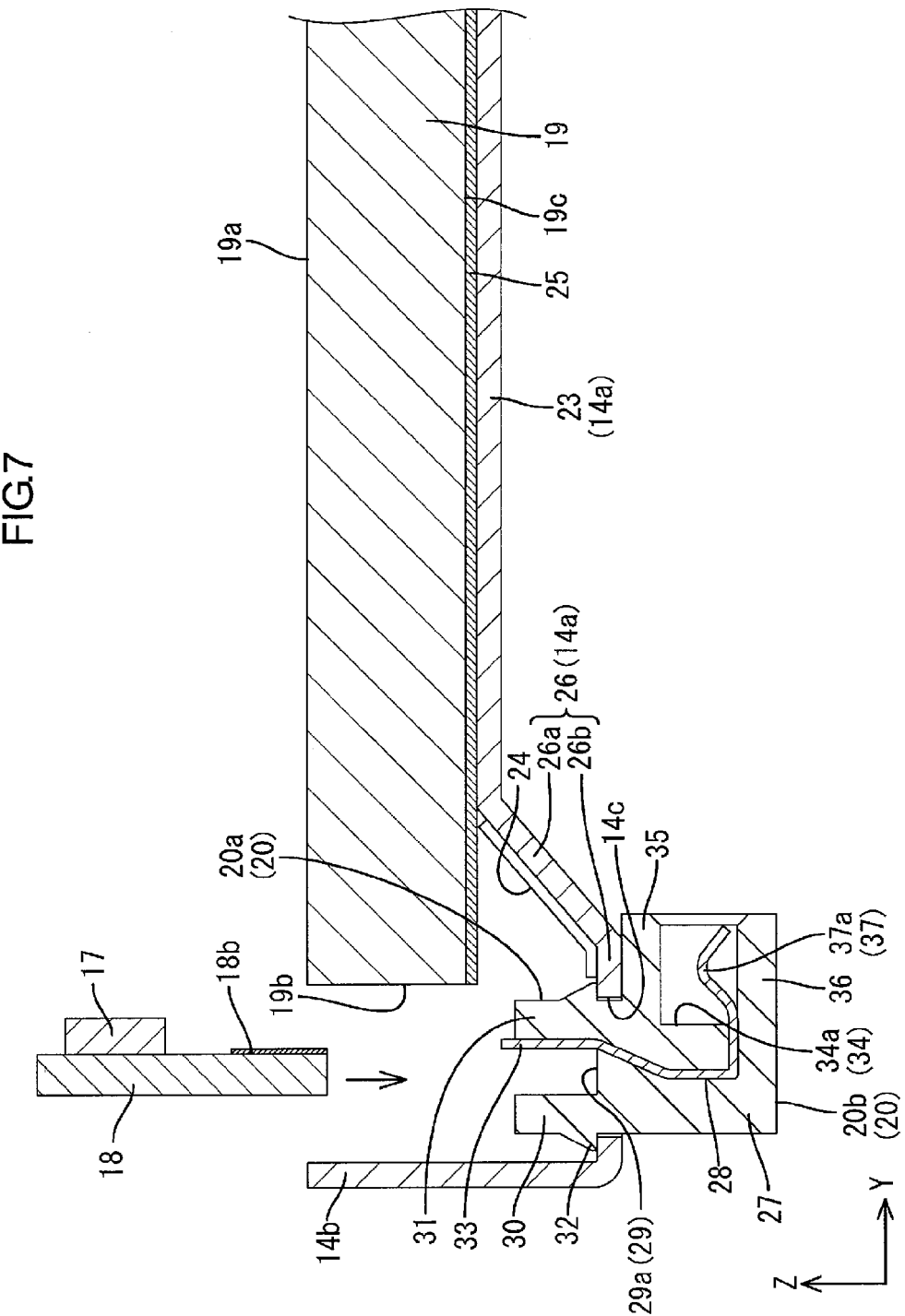
FIG. 7 is a cross sectional view along a line vi-vi in FIG. 4 and shows a state before the LED board is inserted into the connector.

First of all, there is carried out a work of assembling the connector 20, the second reflection sheet 24 and the light guide member 19 within the chassis 14. At a time of assembling the connector 20, the connector 20 is inserted into the assembling hole 14c in the connector assembling portion 26 (the end portion in the short side direction) in the bottom plate 14a of the chassis 14 from the back side. Accordingly, as shown in FIG. 7, since the retention projection 32 is engaged with the edge portion of the assembling hole 14c from the front side, the connector 20 is supported so as to be prevented from removing in a state in which it passes inward and outward through the chassis 14. The second reflection sheet 24 is installed along the connection assembling portion 26 in the bottom plate 14a, and is arranged between the pair of connectors 20 arranged in the X-axis direction (FIG. 4). The light guide member 19 is structured so as to be mounted to the light guide member support portion 23 (the center portion in the short side direction) in the bottom plate 14a in a state in which the light guide reflection sheet 25 is attached to the surface 19c in the back side.

Subsequently, an assembling work of the LED board 18 is carried out. The LED board 18 is assembled between the side plate 14b of the chassis 14 and the light incident surface 19b of the light guide member 19 from the front side along the Z-axis direction (the short side direction of the LED board 18). This work is carried out while positioning each of the terminal portions 18b which are arranged in both end sides in the long side direction in the LED board 18 with regard to the X-axis direction with respect to each of the connectors 20. In the LED board 18, if the end portion in the back side in which the terminal portion 18b is arranged is inserted into the LED board insertion groove 29 of the connector 20, the LED board contact part 33 which is exposed into the LED board insertion groove 29 comes into contact with the terminal portion 18b. Further, if the LED board 18 is inserted to a normal depth, it is brought into contact with the LED board receiving surface 29a of the LED board insertion groove 29 as shown in FIG. 8, whereby a further insertion is regulated. Accordingly, the LED board 18 is positioned in the Z-axis direction with respect to the connector 20 and the light guide member 19. In this inserted state, the LED board 18 is supported in a state of being sandwiched between both the LED board supporting wall portions 30 and 31 in the connector 20. It is fixed to the terminal portion 18b in a contact state by soldering the portion which protrudes to the front side from the inner supporting wall portion 31 in the LED board contact part 33 in this state. In accordance with this, the electric connection between the LED board 18 and the connector 20 is achieved.

Thereafter, the light guide member 19 is supported from the front side and each of the optical members 15 are mounted on the light guide member 19, by assembling the frame 16, and the liquid panel 11 and the bezel 13 are then assembled sequentially. On the other hand, in the back surface side of the chassis 14, the assembling work of the power supply board 21 is carried out. The power supply board 21 is assembled along the Y-axis direction (the short side direction of the power supply board 21) from the center side in the short side direction in the bottom plate 14a, with respect to the power supply board supporting portion 20b of the connector 20. If the end portion in the side in which the pair of terminal portions 21a is arranged in the power supply board 21 is inserted into the power supply board insertion groove 34 of the connector 20, the contact point portion 37a of the power supply board contact part 37 which is exposed into the power supply board insertion groove 34 comes into contact with the terminal portion 21a, whereby the elastic contact part 37 is elastically open deformed. Further, if the power supply board 21 is inserted to the normal depth, it is brought into contact with the power supply board receiving surface 34a of the power supply board insertion groove 34 as shown in FIG. 6, whereby a further insertion is regulated. Accordingly, the power supply board 21 is positioned in the Y-axis direction with respect to the connector 20. In this inserted state, the power supply board 21 is supported in a state of being sandwiched between the front side supporting wall portion 35 in the connector 20, and the power supply board elastic contact part 37. At this time, since the power supply board elastic contact part 37 is elastically deformed, it applies a predetermined snapping force to the power supply board 21, whereby the power supply board 21 is structured such that the mechanical retention is achieved by being elastically sandwiched with respect to the front side supporting wall portion 35, and a contact state can be maintained stably with a predetermined contact pressure with respect to the terminal portion 21a. In accordance with this, an electric connection between the power supply board 21 and the connector 20 is achieved. In other words, the power supply board 21 is relay connected in a state in which the power can be supplied to each of the LEDs 17 in the LED board 18 via the connector 20. As mentioned above, in accordance with the present embodiment, since the mechanical retention and the electrical connection are both achieved by carrying out the work for inserting the power supply board 21 with respect to the power supply board supporting portion 20b, it is more excellent in the assembling workability in comparison with the case that the power supply board is soldered to the connection terminal of the connector such as the conventional one.

If the power source of the liquid crystal display apparatus 10 which is manufactured as mentioned above is turned on, a driving of the liquid crystal panel 11 is controlled by a control circuit which is not illustrated, and a driving power from the power supply board 21 is supplied to each of the LEDs 17 of the LED board 18 via the connector 20, whereby a driving thereof is controlled. The light from each of the LEDs 17 is guided by the light guide member 19, thereby being irradiated to the liquid crystal panel 11. Accordingly, a predetermined image is displayed on the liquid crystal panel 11. A detailed description will be given below of an operation in accordance with the backlight unit 12. If each of the LED 17 is lighted, the light emitting from each of the LEDs 17 is incident to the light incident surface 19b in the light guide member 19 as shown in FIG. 5. In this case, a predetermined space is supported between the LED 17 and the light incident surface 19b; however, since the space is optically closed by the first reflection sheet 22 in the front side and the second reflection sheet 24 in the back side, the light from the LED 17 is repeatedly reflected by both the reflection sheets 22 and 24, thereby being efficiently input to the light incident surface 19b with almost no leakage to the outer portion.

In the case of repairing, inspecting (maintaining) or disposing of the liquid crystal display device 10, it is necessary to disassemble by detaching the constituent parts. At a time of detaching, the detaching work is carried out in accordance with a procedure reverse to that of the assembling work which has already been mentioned. However, a description will be particularly given here of the detaching work of the power supply board 21. At a time of detaching the power supply board 21, since the mechanical retention and the electrical connection are both released by carrying out the work for drawing the power supply board 21 in the direction reverse to the inserting direction along the Y-axis direction from the power supply board supporting portion 20b of the connector 20, it is more excellent in the detaching workability in comparison with the case that the power supply board is soldered to the connection terminal of the connector such as the conventional one.

As described above, the backlight unit 12 in accordance with the present embodiment is provided with the LED board 18 which is the light source board having the LED 17 as the light source, the chassis 14 in which the LED board 18 is accommodated, the light guide member 19 in which the end portion is arranged opposite to the LED 17 of the LED board 18, the power supply board 21 which is arranged outside the chassis 14 and can supply the driving power to the LED 17 of the LED board 18, and the connector 20 which is assembled in the chassis 14 and relays the power supply between the power supply board 21 and the LED 17 of the LED board 18, and the connector 20 is provided with the LED board supporting portion 20a which supports the LED board 18, the power supply board supporting portion 20b which the power supply board 21 can be inserted into and drawn from in the direction along the plate surface thereof and which supports the inserted power supply board 21, and the connection terminal 28 which is brought into contact with the power supply board 21 in the state of allowing the relative slide in the inserting and drawing direction of the power supply board 21.

In accordance with this, the LED board 18 which is accommodated within the chassis 14 is supported by the LED board supporting portion 20a of the connector 20 assembled in the chassis 14, thereby being kept in the state in which the LED 17 is arranged opposite to the end portion of the light guide member 19. In accordance with this, it is possible to stably input the light with respect to the light guide member 19 from the LED 17. On the other hand, the power supply board 21 arranged outside the chassis 14 is inserted in the direction along the plate surface with respect to the power supply board supporting portion 20b of the connector 20 assembled in the chassis 14, whereby a retention thereof is achieved, and the power supply with respect to the LED 17 of the LED board 18 is relayed by the contact of the connection terminal 28. In this case, since the connection terminal 28 is brought into contact with the power supply board 21 in the state in which the relative slide is allowed with respect to the inserting and drawing direction of the power supply board 21, it is more excellent in the workability in accordance with the assembly and the disassembly in comparison with the conventional case that the lead frame is soldered to the power supply board. In other words, in the present embodiment, since the mechanical retention and the electric connection of the power supply board 21 are both achieved by carrying out the work for inserting the power supply board 21 with respect to the power supply board supporting portion 20b at a time of assembling, it is more excellent in the assembling workability than the conventional one. On the other hand, at a time of detaching, in the present embodiment, since the mechanical retention and the electrical connection are both released by carrying out the work for detaching the power supply board 21 from the power supply board supporting portion 20b, it is more excellent in the detaching workability than the conventional one. As mentioned above, in accordance with the present embodiment, it is possible to improve the workability with regard to the assembly and the disassembly.

Further, the power supply board supporting portion 20b has the pair of power supply board supporting wall portions 35 and 36 located opposite to each other and holding the power supply board insertion groove 34 into which the power supply board 21 can be inserted. In accordance with this, if the power supply board 21 is inserted into the power supply board insertion groove 34 of the power supply board supporting portion 20b, the power supply board 21 is sandwiched between the pair of power supply board supporting wall portions 35 and 36, whereby the retention is achieved.

Further, the connection terminal 28 is structured such that the contact position with respect to the power supply board 21 is arranged in the back side supporting wall portion 36 side among the pair of power supply board supporting wall portions 35 and 36. In accordance with this, since the power supply board 21 is received by the front side supporting wall portion 35 which is arranged in the side opposite to the connection terminal 28, in the state in which the contact position of the connection terminal 28 arranged in the back side supporting wall portion 36 side is brought into contact with the power supply board 21, it is possible to obtain a good contact state.

Further, the connection terminal 28 has the power supply board elastic contact part 37 which can come into elastic contact with the power supply board 21. In accordance with this, it is possible to stably maintain the mutual connection state by bringing the power supply board elastic contact part 37 into elastic contact with the power supply board 21.

Further, the power supply board insertion groove 34 is structured so as to be open along the arranging direction of the LED 17 and the light guide member 19. In accordance with this, it is possible to insert the power supply board 21 along the arranging direction of the LED 17 and the light guide member 19 with respect to the power supply board insertion groove 34. In this case, in the light guide member 19, a predetermined magnitude is necessary in the arranging direction with the LED 17 for securing the distance for guiding the light input from the LED 17 by the inner portion, it is possible to sufficiently secure an inserting stroke of the power supply board 21 by bringing the arranging direction into line with the inserting direction of the power supply board 21.

Further, the power supply board receiving surface 34a receiving the power supply board 21 is formed in the far end in the power supply board insertion groove 34. In accordance with this, since it is possible to regulate the inserting depth of the power supply board 21 with respect to the power supply board supporting portion 20b, it is possible to position the power supply board 21 with respect to the connector 20 in the inserting and drawing direction.

Further, the pair of connectors 20 is arranged at the positions which are spaced from each other in the direction along the plate surface of the power supply board 21 and in the direction crossing the inserting and drawing direction of the power supply board 21, and each of the power supply board insertion grooves 34 in the pair of connectors 20 is structured so as to be open toward the respective other connector 20 side. If the power supply board insertion groove is structured so as to be open only in the inserting and drawing direction of the power supply board 21, the power supply board 21 needs to be provided with the partial protruding portion which corresponds to the power supply board insertion groove 34 of the connector 20, and there is a possibility that the partial protruding portion is broken by a stress concentration. In this regard, in the present embodiment, since each of the power supply board insertion grooves 34 in the pair of connectors 20 is structured so as to be open toward the respective other connector 20 side, it is not necessary to set the partial protruding portion as mentioned above to the power supply board 21 which is inserted into each of the power supply board insertion grooves 34 in the pair of connectors 20, whereby it is possible to avoid the generation of the breakage or the like in the power supply board 21.

Further, the chassis 14 has the bottom plate 14a which is arranged in the side opposite to the light output side with respect to the LED board 18 and the light guide member 19 and in which the connector 20 is assembled, and the power supply board 21 is arranged such that the plate surface thereof is parallel to the bottom plate 14a. In accordance with this, it is possible to form the backlight unit 12 thinner with respect to the direction orthogonal to the plate surface of the power supply board 21.

Further, the bottom plate 14a has the light guide member support portion 23 which supports the light guide member 19, and the connector assembly portion 26 in which the connector 20 is assembled, and is structured such that the connector assembly portion 26 protrudes to the outer side than the light guide member support portion 23. In accordance with this, since the connector assembly portion 26 in the bottom plate 14a is structured so as to protrude to the outer side than the light guide member support portion 23, it is possible to sufficiently secure the installing space for the LED board supporting portion 20a of the connector 20 within the chassis 14.

Further, the LED board supporting portion 20a of the connector 20 is arranged at the position deviating from the light guide member 19 in the direction orthogonal to the plate surface of the power supply board 21. In accordance with this, it is possible to avoid a mutual interference between the light guide member 19 and the LED board supporting portion 20a of the connector 20.

Further, the LED board 18 can be inserted into and drawn from the LED board supporting portion 20a in the direction along the plate surface thereof, and the LED board supporting portion 20a has the pair of LED board supporting wall portions 30 and 31 located opposite to each other and holding the LED board insertion groove 29 into which the LED board 18 can be inserted. In accordance with this, if the LED board 18 is inserted into the LED board insertion groove 29 of the LED board supporting portion 20a, the LED board 18 is sandwiched between the pair of LED board supporting wall portions 30 and 31 so as to achieve the retention.

Further, the LED board 18 is provided with the terminal portion 18b which is electrically connected with the LED 17 and with which the connection terminal 28 is brought into contact, and the connection terminal 28 is structured such that the contact position with the terminal portion 18b is arranged in the inner supporting wall portion 31 side among the pair of LED board supporting wall portions 30 and 31. In accordance with this, since the LED board 18 is received by the outer supporting wall portion 30 which is arranged in the side opposite to the connection terminal 28, in the state in which the contact position of the connection terminal 28 arranged in the inner supporting wall portion 31 side is brought into contact with the terminal portion 18b, it is possible to obtain a good contact state.

Further, the LED board receiving surface 29a receiving the LED board 18 is formed in the far end in the LED board insertion groove 29. In accordance with this, since it is possible to regulate the insertion depth of the LED board 18 with respect to the LED board supporting portion 20a, it is possible to position the LED board 18 in the inserting direction with respect to the connector 20.

Further, the assembling hole 14c which is configured to assemble the connector 20 in the state of penetrating inside and outside is formed in the chassis 14. In accordance with this, the LED board 18 within the chassis 14 can be electrically connected to the external portion via the connector 20 which is set to the state of penetrating inside and outside the chassis 14 by being assembled in the assembling hole 14c.

Further, the connector 20 has the connector housing 27 which has the connection terminal 28 built-in and which also has an insulating property. In accordance with this, it is possible to keep the connection terminal 28 in an insulated state with respect to the chassis 14 by the connector housing 27.

Further, the connector housing 27 is made of the synthetic resin, and the connection terminal 28 is inserted into the connector housing 27. In accordance with this, it is possible to reduce a manufacturing cost for the connector 20.

Further, the LED 17 and the end portion of the light guide member 19 which is arranged opposite to the LED 17 are arranged so as to be spaced from each other while keeping a space, and a pair of reflection sheets 22 and 24 arranged so as to sandwich the space is provided. In accordance with this, the light emitted from the LED 17 is repeatedly reflected by the pair of reflection sheets 22 and 24 in the space which is kept between the end portions of the opposed light guide members 19, thereby being efficiently input to the end portion of the light guide member 19. In accordance with this, it is possible to improve an efficiency of utilizing the light.

Further, the light source is constructed by the LED 17. In accordance with this, it is possible to achieve a higher brightness and a lower electric power consumption.

Second Embodiment

A description will be given of a second embodiment in accordance with the present invention with reference to FIGS. 9 to 13. In the second embodiment, there is shown a structure in which a shape of a connector 120 and a connection structure with respect to the LED board 18 are changed. In this case, an overlapping description will be omitted with regard to the same structures, operations and effects as those of the first embodiment mentioned above.

Figure 9:
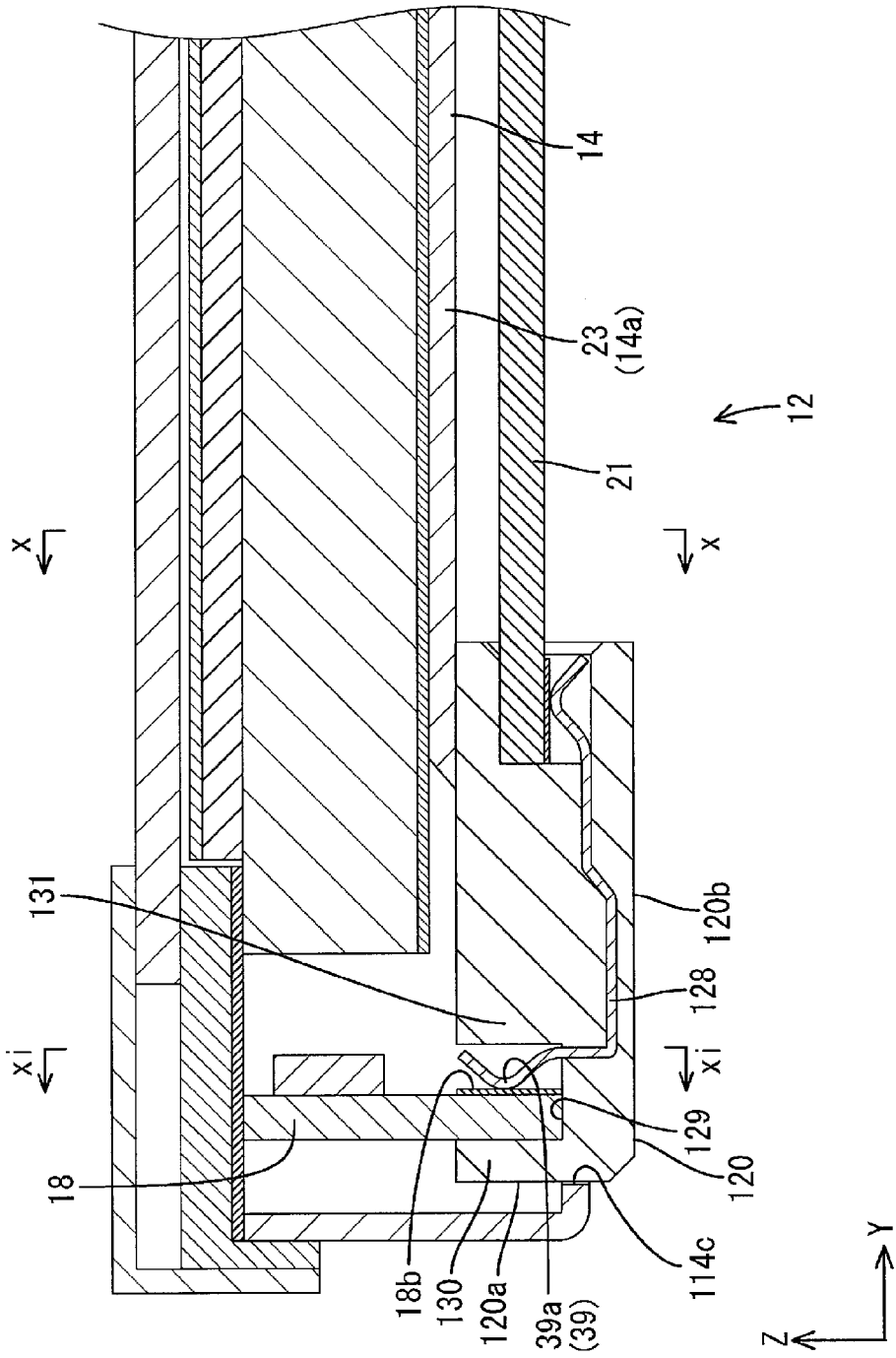
FIG. 9 is a cross sectional view showing a state in which an LED board and a power supply board are inserted into a connector in accordance with a second embodiment of the present invention.
Figure 10:
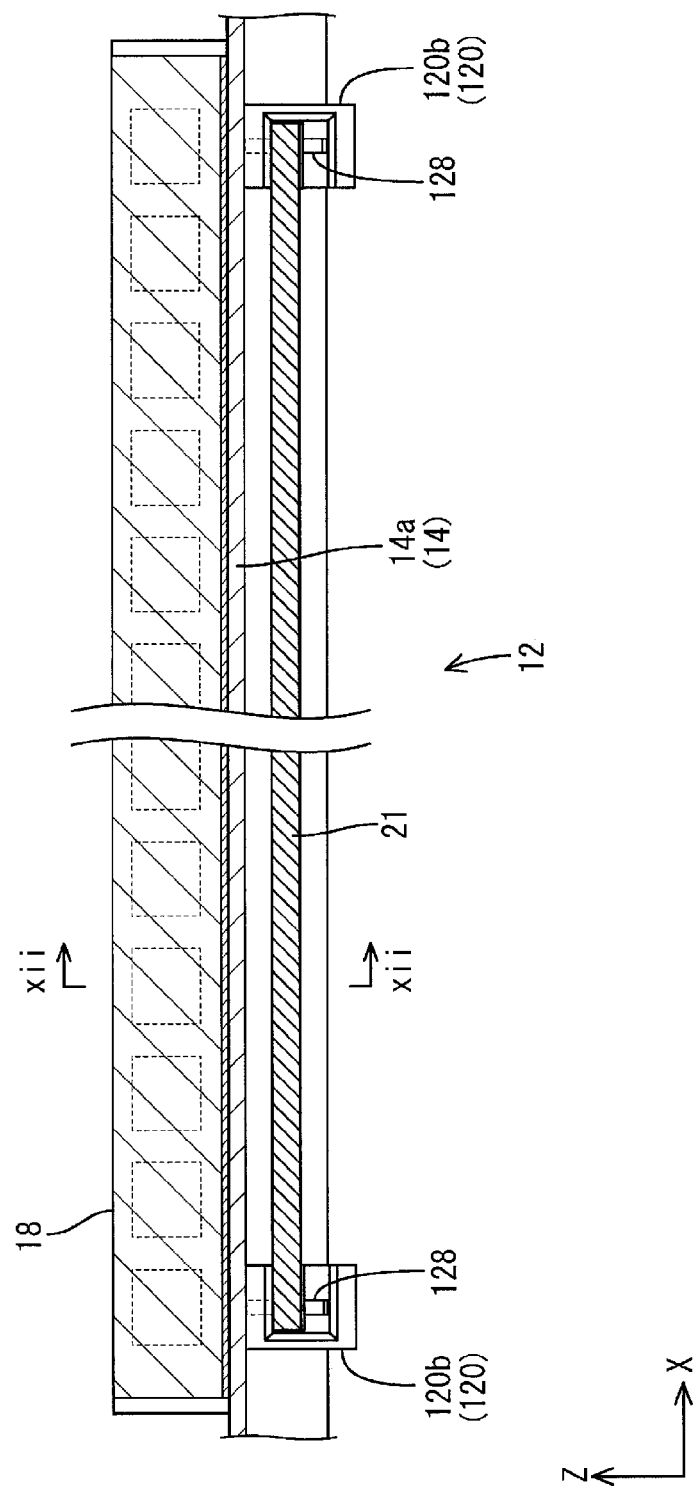
FIG. 10 is a cross sectional view along a line x-x in FIG. 10.
Figure 12:
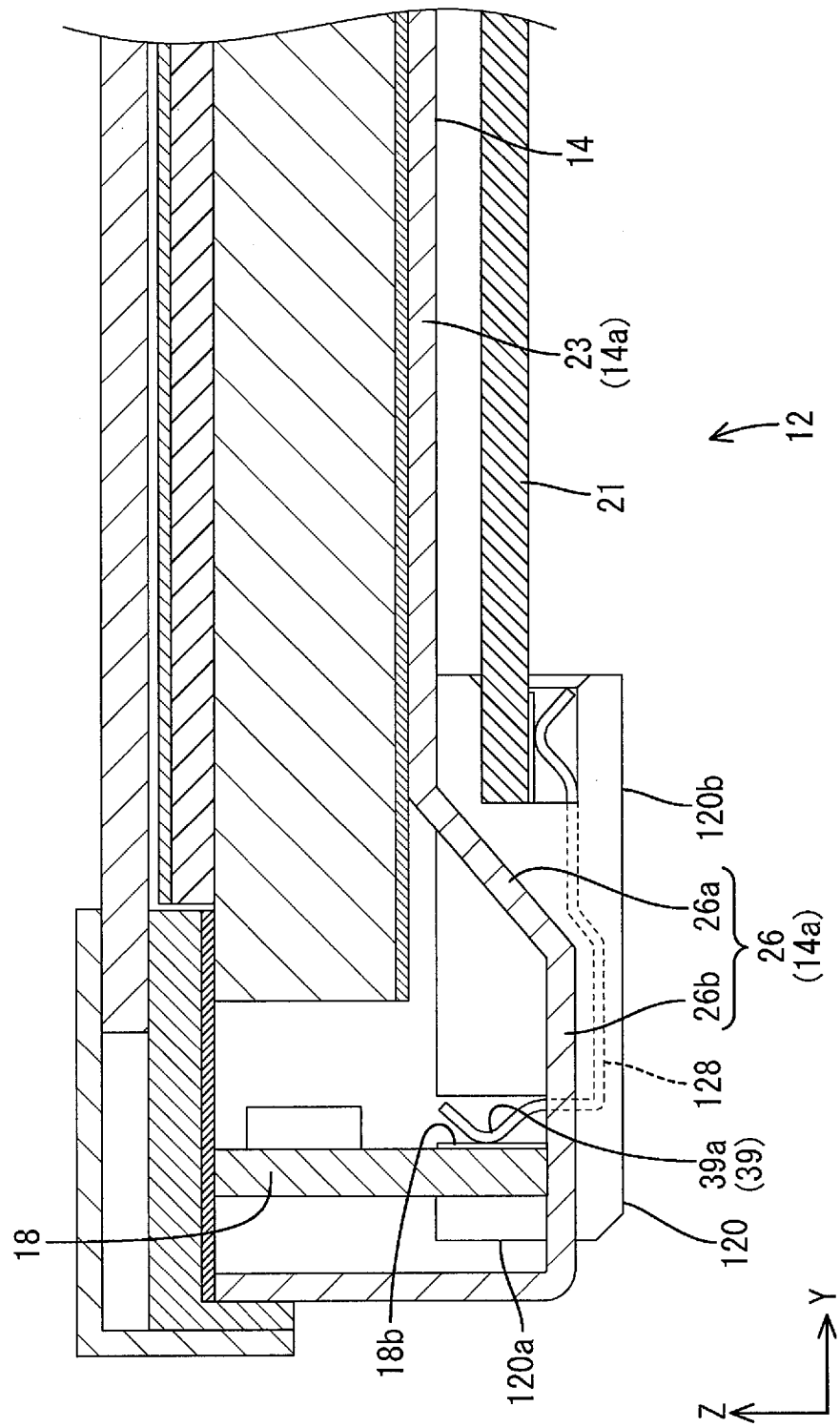
FIG. 12 is a cross sectional view along a line xii-xii in FIG. 11.

The connector 120 in accordance with the present embodiment has a magnitude which is arranged in a range from the light guide member support portion 23 to the connector assembly 26 of the bottom plate 14a of the chassis 14, as shown in FIGS. 9 and 12. In detail, the connector 120 is formed in an approximately block shape which is horizontally-long along the Y-axis direction as a whole, and a power supply board supporting portion 120b thereof is arranged at a position which superposes in a plan view with respect to the light guide member support portion 23. The power supply board supporting portion 120b is arranged at a position which is adjacent to an immediate back side of the light guide member support portion 23, and is arranged at a position which superposes the connector assembly portion 26 in the Z-axis direction, that is, at approximately the same position. The power supply board 21 which is inserted into and drawn from the power supply board supporting portion 120b is arranged in an inner side than the outer end portion 26b of the connector assembly portion 26 in the Z-axis direction, as shown in FIGS. 10 and 12, and is prevented from protruding outward from the outer end portion 26b in the Z-axis direction. Accordingly, it can be said that the backlight unit 12 in accordance with the present embodiment is made thinner in the Z-axis direction than the structure described in the first embodiment mentioned above. In order to assemble the connector 120 having the magnitude mentioned above, an assembling hole 114c formed in the bottom plate 14a is formed in a range which overstrides a rising portion 26a from an outer end portion 26b in the connector assembly portion 26 in the Y-axis direction.

Figure 13:
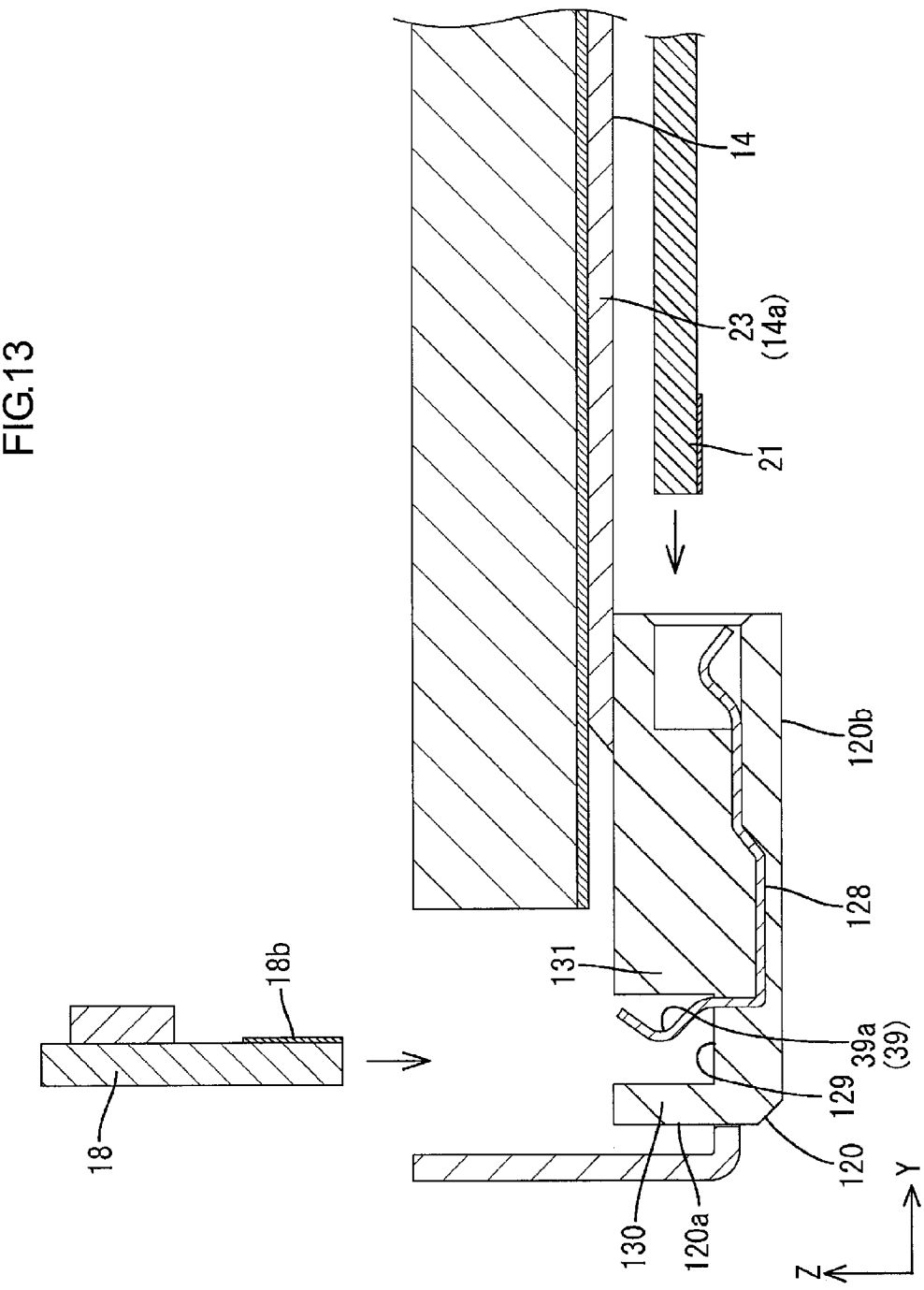
FIG. 13 is a cross sectional view showing a state before an LED board and a power supply board are inserted into a connector.

On the other hand, a connection terminal 128 of the connector 120 in accordance with the present embodiment has an LED board elastic contact part 39 which is brought into elastic contact with the terminal portion 18b of the LED board 18, in place of the LED board contact part 33 in accordance with the first embodiment mentioned above, as shown in FIG. 9. The LED board elastic contact part 39 is arranged so as to be exposed into an LED board insertion groove 129 by protruding from an inner supporting wall portion 131 side in the LED board supporting portion 120a toward an outer supporting wall portion 130, that is, the inserted LED board 18 side, and a cross sectional shape thereof is formed as an approximately V-shaped form. The LED board elastic contact part 39 can be elastically deformed around a protruding base end portion from the inner supporting wall portion 131 as a supporting point. In the LED board elastic contact part 39, a protruding leading end portion to the LED board 18 side is set to a contact point 39a with respect to the terminal portion 18b. The contact point 39a is arranged at a position at which a distance held with respect to the outer supporting wall portion 130 becomes a little smaller than a thickness of the LED board 18 in a state before inserting the LED board 18 (FIG. 13). Therefore, if the LED board 18 is inserted into the LED board insertion groove 129, the LED board elastic contact part 39 is structured so as to be elastically deformed while opening in connection with the contact of the contact point 39a with the terminal portion 18b. In accordance with this, it is possible to mechanically support the LED board 18 with respect to the outer supporting wall portion 130 on the basis of a snapping force applied from the LED board elastic contact part 39, and it is possible to keep the LED board elastic contact part 39 in a contact state with respect to the terminal portion 18b at a predetermined contact pressure.

As mentioned above, the LED board elastic contact part 39 of the connection terminal 128 is structured such that an electric connection state can be maintained by being elastically brought into contact with the terminal portion 18*b* of the LED board 18. Since the LED board elastic contact part 39 and the terminal portion 18*b* are not fixed by soldering or the like, and also both the LED board supporting wall portions 130 and 131 in the LED board supporting portion 120*a* are open to both sides in the X-axis direction, they can be relatively slid along the surface of the terminal portion 18*b* while maintaining the mutual contact state. Accordingly, for example, even in the case that the LED board 18 expands or contracts in the long side direction (the X-axis direction) in connection with the thermal expansion or the thermal contraction, the terminal portion 18*b* can relatively slide in the X-axis direction while maintaining the contact state with respect to the LED board elastic contact part 39. In accordance with this, it is possible to allow the expansion or contraction of the LED board 18 in connection with the thermal expansion or the thermal contraction without causing a contact defect.

Figure 11:
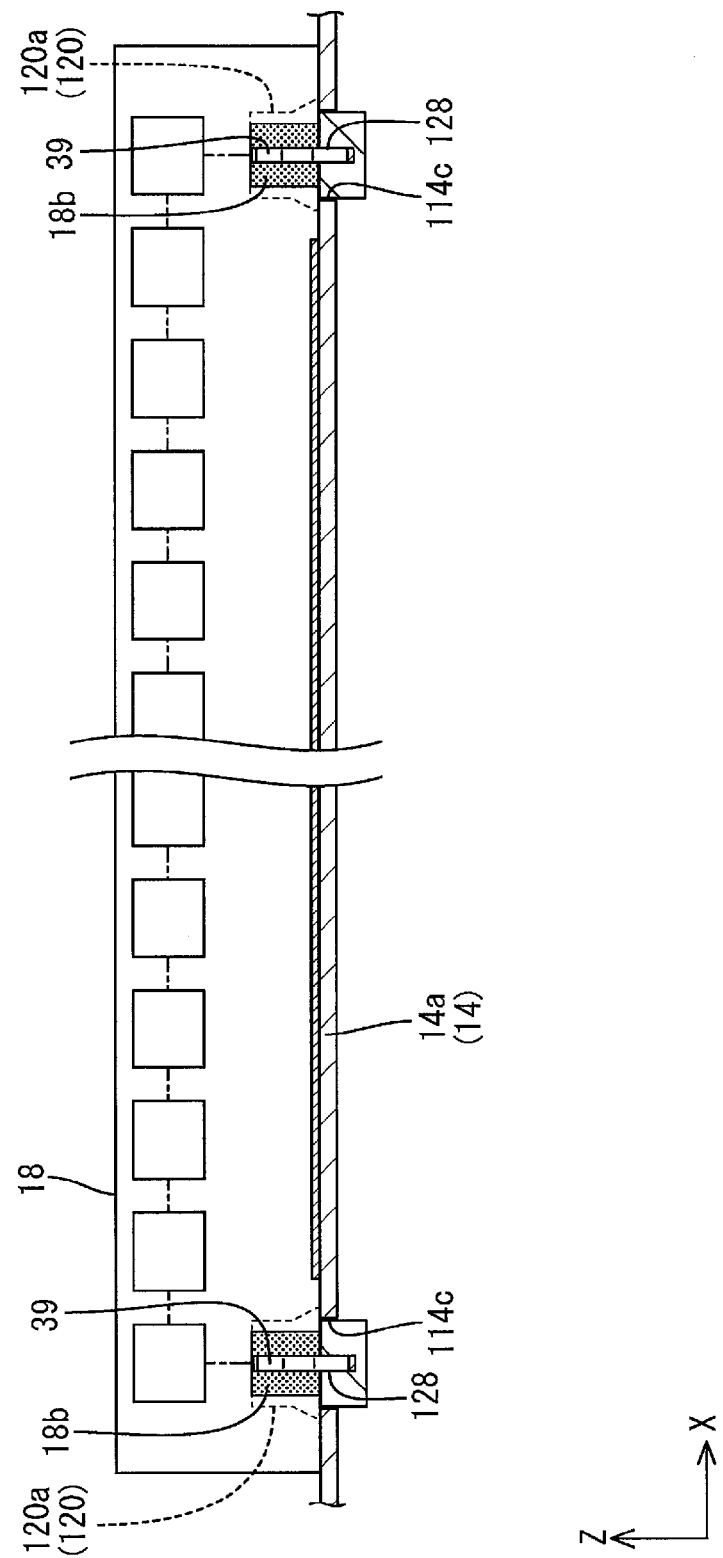
FIG. 11 is a cross sectional view along a line xi-xi in FIG. 10.

Further, in the present embodiment, the terminal portion 18*b* is structured, as shown in FIG. 11, such that a dimension in the X-axis direction is relatively larger than the LED board elastic contact part 39 (the connection terminal 28). In other words, the terminal portion 18*b* is formed wider than the LED board elastic contact part 39 (the connection terminal 28) in the long side direction of the LED board 18. In a state in which the LED board 18 is fitted to the connector 120 while being regularly positioned in the X-axis direction, the LED board elastic contact part 39 is brought into contact at approximately the center position in the X-axis direction in the terminal portion 18*b*, and a margin portion of the terminal portion 18*b* is secured at a predetermined width in each of both sides of the LED board elastic contact part 39. Accordingly, even in the case that the LED board 18 expands or contracts in the long side direction in connection with the thermal expansion or the thermal contraction, and the terminal portion 18*b* relatively slides in the X-axis direction with respect to the LED board elastic contact part 39, the LED board elastic contact part 39 is structured such that a contact state can be securely maintained by being brought into contact with the margin portion of the terminal portion 18*b* mentioned above. In accordance with this, it is possible to avoid the contact defect being generated between the LED board 18 and the connector 20, whereby a high connection reliability can be obtained. In this case, a dimension in the X-axis direction in the terminal portion 18*b* is set to a magnitude which makes allowance for an assumable maximum value of an expansion or contraction amount of the LED board 18 in connection with the thermal expansion or the thermal contraction. In this case, the terminal portion 18*b* is illustrated by hatching in FIG. 11.

As described above, in accordance with the present embodiment, the connector 120 is arranged in the range from the connector assembly portion 26 to the light guide member support portion 23, and the power supply board supporting portion 120*b* is arranged at the position which superposes the light guide member support portion 23. In accordance with this, since the power supply board supporting portion 120*b* is arranged at the position which superposes the light guide member support portion 23 arranged relatively in the inner side with respect to the connector assembly portion 26, it is harder for the power supply board 21 and the power supply board supporting portion 120*b* to protrude further to the outer side from the connector assembly portion 26, whereby it is possible to make the backlight unit 12 much thinner in the direction orthogonal to the plate surface of the power supply board 21.

Further, the power supply board 21 is arranged in the inner side than the outer end of the connector assembly portion 26 in the direction orthogonal to the plate surface of the power supply board 21. In accordance with this, since the power supply board 21 is prevented from protruding further to the outer side from the connector assembly portion 26, it is possible to make the backlight unit 12 thinner in the direction orthogonal to the plate surface of the power supply board 21.

Further, the LED board 18 can be inserted into and drawn from the LED board supporting portion 120*a* in the direction along the plate surface thereof, and the connection terminal 128 is brought into contact with the LED board 18 in a state of allowing a relative slide in the inserting and drawing direction of the LED board 18. In accordance with this, since the connection terminal 128 is brought into contact with the LED board 18 in the state of allowing the relative slide in the inserting and drawing direction of the LED board 18, it is more excellent in the workability in accordance with the assembly and the disassembly in comparison with the conventional case that the lead frame is soldered to the LED board. In other words, in the present embodiment, since the mechanical retention and the electrical connection of the LED board 18 can be both achieved by carrying out the work for inserting the LED board 18 into the LED board supporting portion 120*a* at a time of assembling, it is more excellent in the assembling workability than the conventional one. On the other hand, at a time of detaching, in the present embodiment, since the mechanical retention and the electrical connection are both released by carrying out the work for drawing the LED board 18 from the LED board supporting portion 120*a*, it is more excellent in the detaching workability than the conventional one.

Further, the connection terminal 128 has the LED board elastic contact part 39 which can come into elastic contact with the terminal portion 18*b*. In accordance with this, it is possible to stably maintain the mutual connection state by bringing the LED board elastic contact part 39 into elastic contact with the terminal portion 18*b* of the LED board 18.

Further, the LED board 18 is provided with the terminal portion 18*b* which is formed in an elongated shape and is electrically connected to the LED 17; however, the connection terminal 128 is brought into contact with the terminal portion 18*b* in the state of allowing the relative slide in the long side direction of the LED board 18. In accordance with this, in the case that the LED board 18 expands or contracts in the long side direction in connection with the thermal expansion or the thermal contraction, the stress has been conventionally applied to the soldered portion and there has been a risk that the crack is generated, since the lead frame has been soldered to the LED board 18. In comparison with this, in accordance with the present embodiment, since the connection terminal 128 and the terminal portion 18*b* can be relatively slid in the long side direction of the LED board 18 while maintaining the contact state with each other, it is possible to avoid generation of the contact defect. Particularly, in the case that the backlight unit 12 is increased in size, the LED board 18 tends to be elongated in the long side direction, and an expansion or contraction amount accordingly becomes larger in connection with the thermal expansion or the thermal contraction. Therefore, the present embodiment can be said to be preferable from the aspect of size increase.

Further, the terminal portion 18*b* is formed relatively wider than the connection terminal 128 in the long side direction of the LED board 18. In accordance with this, even in the case that the LED board 18 expands or contacts in the long side direction in connection with the thermal expansion or the thermal contraction, whereby the terminal portion 18b and the connection terminal 128 relatively slide in the long side direction, it is possible to well maintain the contact state of the connection terminal 128 since the terminal portion 18b is made relatively wider in the long side direction. In this case, since the terminal portion 18b is formed in the elongated LED board 18 while being wide as mentioned above, it is possible to easily secure an installing space without increasing the size of the LED board 18. On the contrary, since the connection terminal 128 in the connector 120 side can be relatively narrower, it is possible to avoid the size increase of the connector 120.

Further, the LED board insertion groove 129 is structured so as to be open along the short side direction of the LED board 18. In accordance with this, it is possible to insert the LED board 18 along the short side direction with respect to the LED board supporting portion 120a of the connector 120.

Further, the LED board insertion groove 129 is structured so as to be open along the long side direction of the LED board 18. In accordance with this, since the LED board 18 is structured so as to freely expand and contract in the long side direction in the state of being inserted into the LED board insertion groove 129, it is possible to avoid the stress being generated in the LED board 18 at a time when the thermal expansion or the thermal contraction is generated and causes deformation.

Third Embodiment

Figure 15:
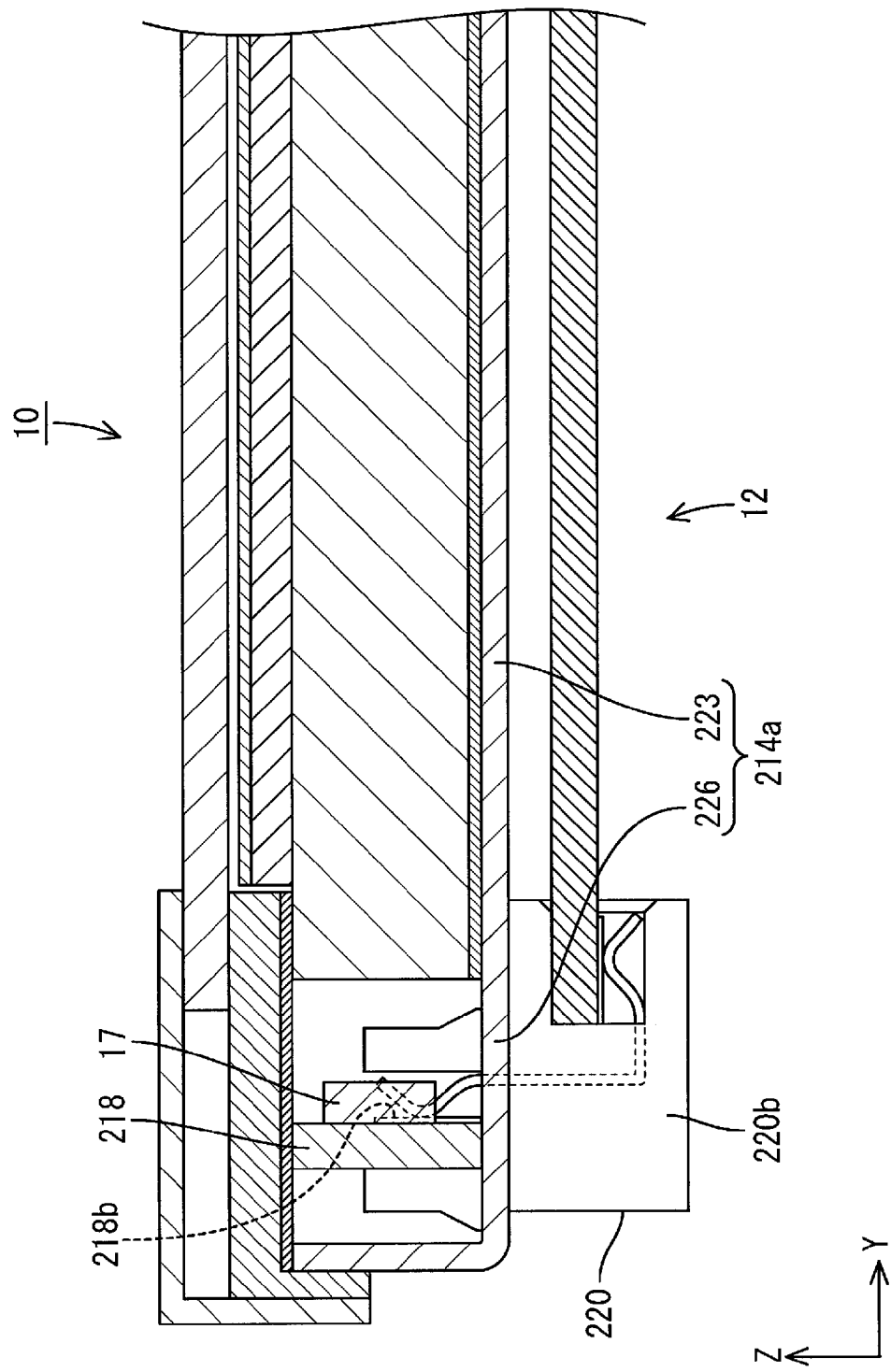
FIG. 15 is a cross sectional view along a line xv-xv in FIG. 10.
Figure 16:
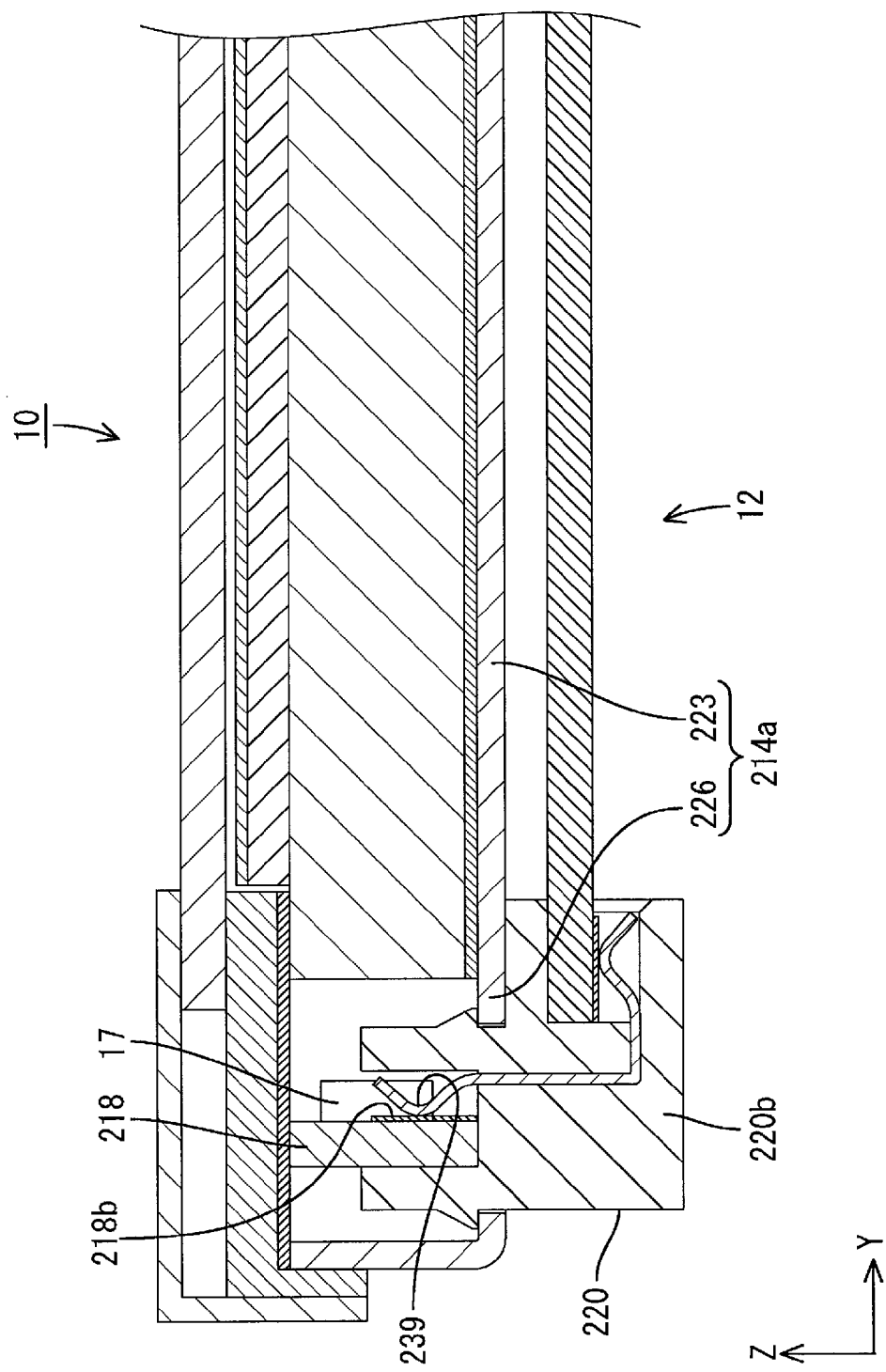
FIG. 16 is a cross sectional view along a line xvi-xvi in FIG. 10.

A description will be given of a third embodiment in accordance with the present invention with reference to FIGS. 14 to 16. In the third embodiment, there is shown a structure in which an arrangement of a terminal portion 218b is changed from the second embodiment mentioned above. In this case, an overlapping description will be omitted with regard to the same structures, operations and effects as those of the first embodiment mentioned above.

Figure 14:
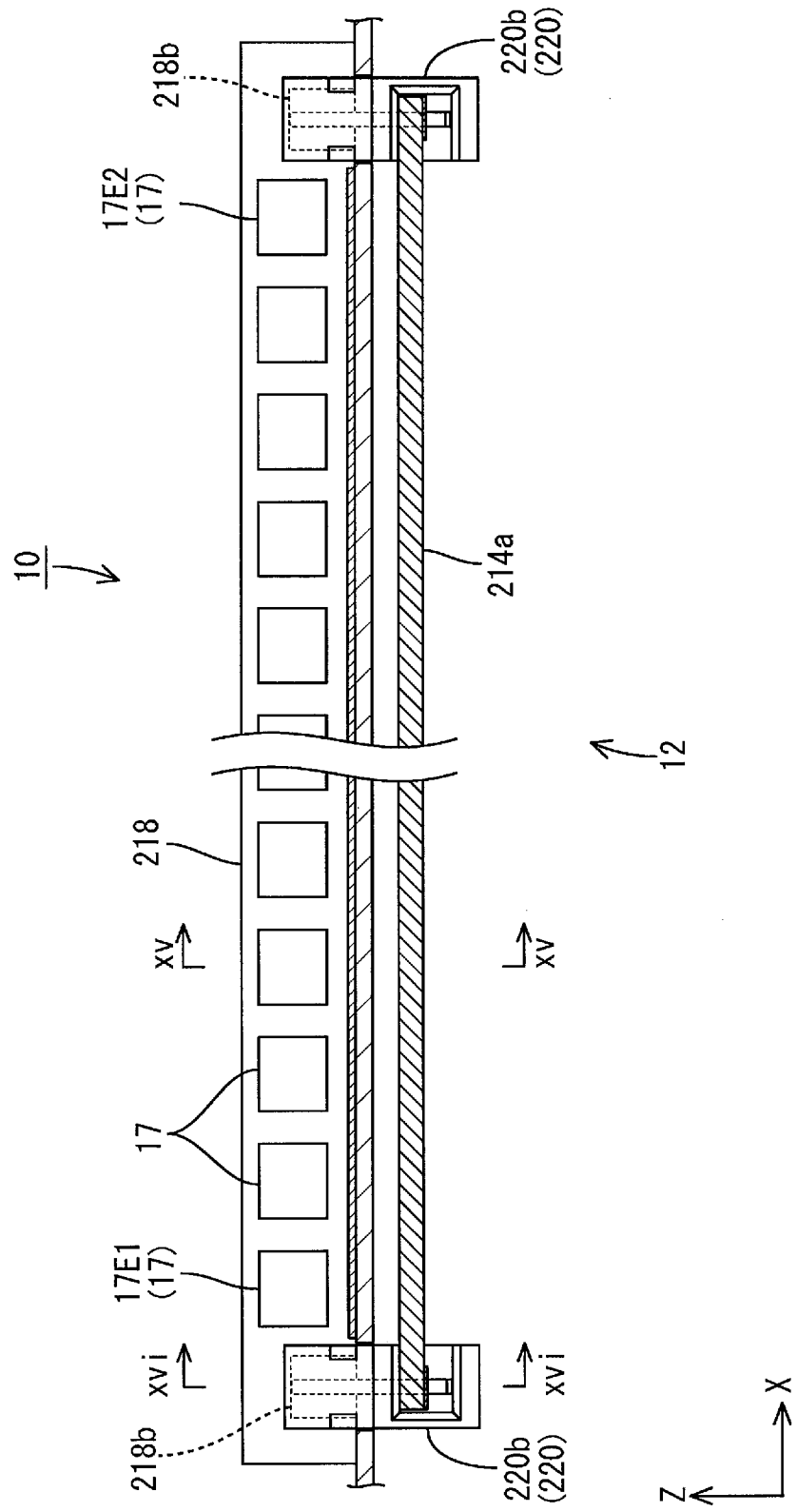
FIG. 14 is a cross sectional view showing a cross sectional structure of an LED board, a chassis, a connector, a power supply board and the like in accordance with a third embodiment of the present invention.

The terminal portion 218b is arranged at a position relatively deviating in a long side direction (a direction of an X-axis) with respect to the LED 17 in an LED board 218, as shown in FIG. 14. In detail, the terminal portion 218b is arranged closer to an end than the LEDs 17E1 and 17E2 which are positioned in an end in the long side direction in the LED board 18, and is arranged parallel to the LEDs 17E1 and 17E2 in the X-axis direction. It can be said that the terminal portion 218b is arranged so as to overlap in a Z-axis direction with respect to the LED 17 as shown in FIGS. 15 and 16. In accordance with this, it is possible to make a dimension of a short side of the LED board 218 smaller in comparison with the first embodiment mentioned above. Accordingly, it is possible to make smaller (that is, thinner) the backlight unit 12 and the liquid crystal display device 10 in the Z-axis direction. In this case, a bottom plate 214a is formed in a flat shape over all the region from a light guide member support portion 223 to a connector assembling portion 226. Further, a connector 220 is structured approximately as the same as the second embodiment with regard to an LED board elastic contact part 239; however, the other structures (a power supply board supporting portion 220b and the like) are structured approximately as the same as the first embodiment.

As mentioned above, in accordance with the present embodiment, the terminal portion 218b is arranged at the position relatively deviating with respect to the LED 17 in the long side direction of the LED board 218. In accordance with this, in comparison with the case that the terminal portion 18b and the LED 17 are arranged so as to relatively deviate from each other in the short side direction of the LED board 18 as in the first and second embodiments, it is possible to downsize the LED board 218 in the short side direction. In accordance with this, it is possible to make the entire backlight unit 12 thinner.

Other Embodiment

The present invention is not limited to the above embodiments explained in the above description. The following embodiments, for example, may be included in the technical scope of the present invention.

Figure 17:
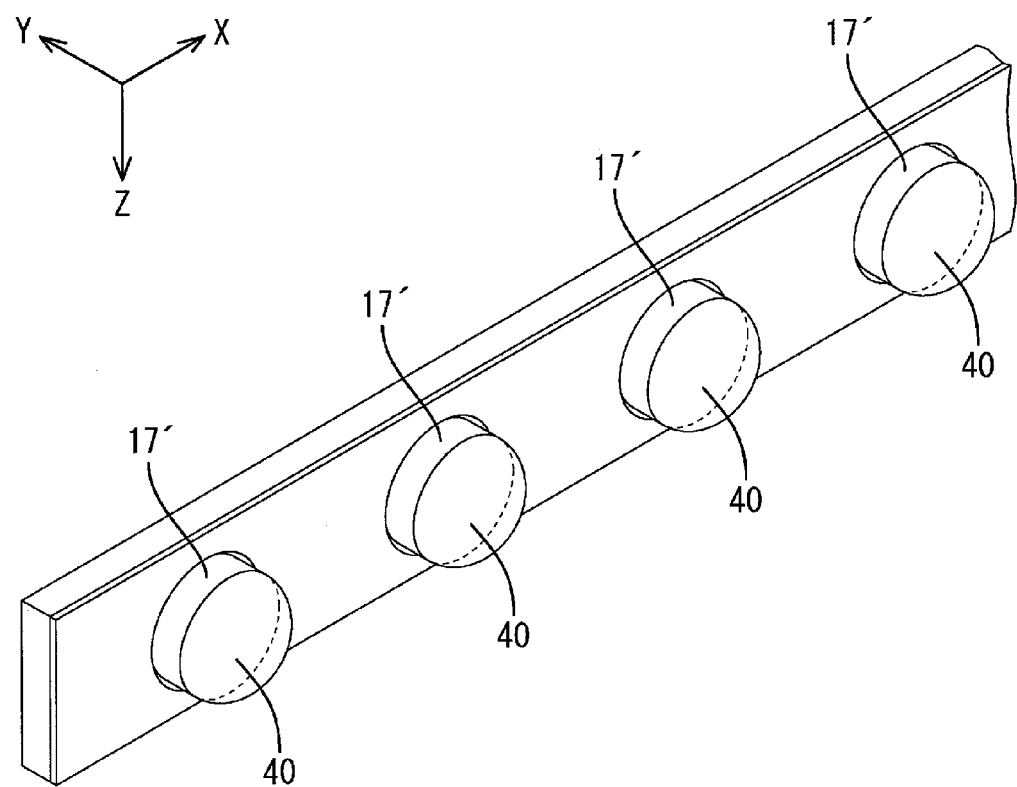
FIG. 17 is a perspective view of an LED board in accordance with another embodiment (1) of the present invention.

(1) The LED mounted to the LED board can be structured as follows. A light emitting surface side of an LED 17' is provided with a lens member 40 for outputting the light while diffusing at a wide angle as shown in FIG. 17. The lens member 40 is interposed between the LED 17' and the light incident surface of the light guide member, and a light output surface thereof is formed in a spherical shape so as to be concave to the light guide member side.

(2) In the first embodiment mentioned above, it is possible to apply the connecting structure between the LED board and the connector described in the second embodiment (the structure in which the LED board elastic contact part is brought into elastic contact with the terminal portion and the relative slide is allowed in the long side direction of the LED board). In the same manner, it is possible to apply the arrangement structure between the terminal portion and the LED described in the third embodiment to the structure in accordance with the first embodiment or the second embodiment.

(3) In each of the embodiments mentioned above, there is shown the structure in which the power supply board is sandwiched between a pair of power supply board supporting wall portions in the connector; however, for example, the back side supporting wall portion in the pair of power supply board supporting wall portions may be omitted. On the contrary, the front side supporting wall portion in the pair of power supply board supporting wall portions may be omitted, and particularly in the second embodiment, the power supply board may be received by the bottom plate of the chassis.

(4) In each of the embodiments mentioned above, there is shown the structure in which the LED board is sandwiched between a pair of LED board supporting wall portions in the connector; however, for example, the inner supporting wall portion in the pair of LED board supporting wall portions may be omitted. On the contrary, the outer supporting wall portion in the pair of LED board supporting wall portions may be omitted. In this case, the LED board may be received by the side plate of the chassis.

(5) In each of the embodiments mentioned above, there is shown the structure in which the power supply board elastic contact part is arranged in the back side supporting wall portion side in a pair of power supply board supporting wall portions in the connector; however, the structure in which the power supply board elastic contact part is arranged in the front side supporting wall portion side is included in the present invention.

(6) In each of the embodiments mentioned above, there is shown the structure in which the LED board contact part (the LED board elastic contact part) is arranged in the inner supporting wall portion side in a pair of LED board supporting wall portions in the connector; however, the structure in which the LED board contact part (the LED board elastic contact part) is arranged in the outer supporting wall portion side is included in the present invention.

(7) In each of the embodiments mentioned above, there is shown the structure in which the power supply board insertion groove is open to both the Y-axis direction and the X-axis direction; however, the structure in which the power supply board insertion groove is open only in the Y-axis direction, and is closed in the X-axis direction is included in the present invention. On the contrary, the structure in which the power supply board insertion groove is open only in the X-axis direction and is closed in the Y-axis direction is also included in the present invention, and in this case, the power supply board may be inserted into the power supply board insertion groove along the X-axis direction.

(8) In each of the embodiments mentioned above, there is shown the structure in which the power supply board insertion groove is open only to the center side (the side of another connector) in the long side direction of the bottom plate in the X-axis direction; however, the structure in which the power supply board insertion groove is open to both sides in the X-axis direction in the same manner as the LED board insertion groove is included in the present invention.

(9) In each of the embodiments mentioned above, there is shown the structure in which the LED board insertion groove is open to both sides in the X-axis direction; however, the structure in which the LED board insertion groove is open only to the center side (the side of another connector) in the long side direction of the bottom plate in the X-axis direction in the same manner as the power supply board insertion groove is included in the present invention.

(10) In each of the embodiments mentioned above, there is shown the structure in which the terminal portion is formed wider in the long side direction of the LED board than the elastic contact part; however, a structure in which the elastic contact part is formed wider in the long side direction of the LED board than the terminal portion is included in the present invention.

(11) In each of the embodiments mentioned above, there is shown the structure in which the LED board is of the single-sided type; however, it can be of a both-sided type. In this case, the LED may be formed on one surface of the LED board, and the terminal portion may be formed on the other surface, respectively.

(12) In the first and second embodiments mentioned above, there is shown the structure in which the terminal portions are arranged so as to be lined up in the Z-axis direction with respect to the LED, that is, arranged so as to approximately coincide in the X-axis direction; however, a structure in which the terminal portions are arranged at positions deviating in the X-axis direction with respect to the LED is included in the present invention. In addition, for example, a structure in which the terminal portions are arranged so as to be lined up in the Z-axis direction with respect to the LED positioned close to the center, rather than the LED positioned at the end in the long side direction in the LED board is included in the present invention.

(13) In each of the embodiments mentioned above, there is shown the case of using the LED of the type that has the built-in blue LED chip emitting the single blue light, and emits the approximately white light by the fluorescent material; however, a structure using an LED of a type that has a built-in LED chip emitting a single ultraviolet light (a lavender light) built-in, and emits the approximately white light by the fluorescent material is included in the present invention.

(14) In each of the embodiments mentioned above, there is shown the case of using the LED of the type that has the built-in LED chip emitting the single blue color and emits the approximately white light by the fluorescent material; however, a structure using an LED of a type that has three kinds of built-in LED chips emitting a red light, a green light and a blue light, respectively, is included in the present invention. In addition, a structure using an LED of a type that has three kinds of built-in LED chips emitting a cyan light (C), a magenta light (M) and a yellow light (Y), respectively, is included in the present invention.

(15) In each of the embodiments mentioned above, there is shown the structure in which a pair of LED boards (LEDs) is arranged in the end portions in both the long sides in the chassis (the light guide member); however, a structure in which the pair of LED boards (LEDs) is arranged in the end portions in both the short sides in the chassis (the light guide member) is included in the present invention, for example.

(16) In addition to the item (15) mentioned above, a structure in which a pair of LED boards (LEDs) is arranged in the end portions of each of both the long sides and both the short sides in the chassis (the light guide member), and a structure in which one LED board (LED) is arranged only in the end portion of one long side or one short side in the chassis (the light guide member) are also included in the present invention.

(17) In the embodiment mentioned above, the TFT is used as the switching component of the liquid crystal display device; however, it is possible to apply the invention to a liquid crystal display device which uses switching components (for example, a thin-film diode (TFD)) other than the TFT, and it is possible to apply the invention to a liquid crystal display device which carries out a monochrome display in addition to the liquid crystal display device which carries out a color display.

(18) In each of the embodiments mentioned above, there is exemplified the liquid crystal display device which uses the liquid crystal panel as the display panel; however, the present invention can be applied to a display device which uses other kinds of display panel.

(19) In each of the embodiments mentioned above, there is exemplified the television receiver which is provided with the tuner; however, the present invention can be applied to a display device which is not provided with the tuner.

EXPLANATION OF SYMBOLS

10: Liquid crystal display device (Display device)
11: Liquid crystal panel (Display panel)
12: Backlight unit (Lighting device)
14: Chassis,
14a: Bottom plate (Bottom portion)
14c: Assembling hole
17: LED (Light source)
18: LED board (Light source board),
18b: Terminal portion
19: Light guide member
20: Connector
21: Power supply board
22: First reflection sheet (Reflection member)
23: Light guide member support portion
24: Second reflection sheet (Reflection member)
26: Connector assembly portion
27: Connector housing
28: Connection terminal
29: LED board insertion groove (Light source board insertion groove)
30: Outer supporting wall portion (Light source board supporting wall portion)
31: Inner supporting wall portion (Light source board supporting wall portion)
34: Power supply board insertion groove 35: Front side supporting wall portion (Power supply board supporting wall portion)
36: Back side supporting wall portion (Power supply board supporting wall portion)
37: Power supply board elastic contact part
39: LED board elastic contact part (Light source board elastic contact part)
TV: Television receiver

The invention claimed is:

1. A lighting device comprising:
a light source board on which a light source is arranged;
a chassis configured to house the light source board;
a light guide member having an end portion and provided such that the end portion faces the light source of the light source board;
a power supply board arranged outside the chassis and configured to supply drive power to the light source of the light source board; and
a connector mounted to the chassis and configured to connect the power supply board and the light source of the light source board and supply power therebetween, the connector including a light source board supporting portion, a power supply board supporting portion and a connection terminal, the power supply board configured to support the light source board, the power supply board supporting portion having a plate surface along which the power supply board moves to be inserted and removed and configured to support the inserted power supply board, and the connection terminal configured to come in contact with the power supply board such that the power supply board slidably moves to be inserted and removed.

2. The lighting device according to claim 1, wherein the power supply board supporting portion includes a power supply board insertion groove configured to receive the power supply board and includes a pair of power supply board supporting wall portions that face each other.

3. The lighting device according to claim 2, wherein the connection terminal has power supply board supporting wall portions.

4. The lighting device according to claim 2, wherein the connection terminal has a power supply board elastic contact part configured to be in elastic contact with the power supply board.

5. The lighting device according to claim 2, wherein the power supply board insertion groove extends and is open in an arrangement direction in which the light source and the light guide member are arranged.

6. The lighting device according to claim 2, wherein the power supply board insertion groove has a power supply board receiving surface on a bottom end of the groove and the power supply board receiving surface is configured to receive the power supply board.

7. The lighting device according to claim 2, wherein:
the connector includes a pair of connectors that are arranged so as to be away from each other along a plate surface of the power supply board and in a direction that crosses a direction in which the power supply board is inserted and removed; and
the power supply board insertion groove includes a pair of power supply board insertion grooves and the power supply board insertion groove corresponding to one of the pair of connectors is open toward the power supply board insertion groove corresponding to another one of the pair of connectors.

8. The lighting device according to claim 1, wherein:
the chassis has a bottom portion that is arranged on a side opposite to a light output side with respect to the light source board and the light guide member and to which the connector is mounted; and
the power supply board is arranged such that a plate surface thereof is parallel to the bottom portion.

9. The lighting device according to claim 8, wherein the bottom portion has a light guide member support portion configured to support the light guide member, and a connector assembly portion to which the connector is mounted, and the connector assembly portion that is provided on an outer side than the light guide member support portion.

10. The lighting device according to claim 9, wherein the connector is arranged over a range from the connector assembly portion to the light guide member support portion, and the power supply board supporting portion is arranged so as to overlap the light guide member support portion.

11. The lighting device according to claim 10, wherein the power supply board is arranged in an inner side from an outer end of the connector assembly portion in a direction orthogonal to a plate surface of the power supply board.

12. The lighting device according to claim 9, wherein the light source board supporting portion of the connector is arranged so as not to overlap the light guide member in a direction orthogonal to a plate surface of the power supply board.

13. The lighting device according to claim 1, wherein:
the light source board is configured to be inserted into and removed from the light source board supporting portion along a plate surface thereof; and
the light source board supporting portion includes a light source board insertion groove into which the light source board is inserted and includes a pair of light source board supporting wall portions that face each other.

14. The lighting device according to claim 13, wherein:
the light source board is provided with a terminal portion configured to be electrically connected to the light source and come in contact with the connection terminal; and
the connection terminal includes a contact portion that is in contact with the terminal portion and provided close to one of the light source board supporting wall portions.

15. The lighting device according to claim 13, wherein the light source board insertion groove has a light source board receiving surface on a bottom end of the groove and the light source board receiving surface receives the light source board.

16. The lighting device according to claim 1, wherein:
the light source board is configured to be inserted into and removed from the light source board supporting portion along a plate surface thereof; and
the connection terminal is configured to be in contact with the light source board such that the light source board slidably moves to be inserted and removed.

17. The lighting device according to claim 16, wherein the connection terminal has a light source board elastic contact part that is configured to come into elastic contact with the terminal portion.

18. The lighting device according to claim 16, wherein the light source board is provided with a terminal portion that is formed in an elongated shape and is electrically connected to the light source, and the connection terminal is brought into contact with the terminal portion so as to relatively slide in a long side direction of the light source board.

19. The lighting device according to claim 18, wherein the terminal portion is formed relatively wider than the connection terminal in the long side direction of the light source board.

20. The lighting device according to claim 18, wherein the light source board insertion groove is configured to be open along the short side direction of the light source board.

21. The lighting device according to claim 20, wherein the light source board insertion groove is configured to be open along the long side direction of the light source board.

22. The lighting device according to claim 1, wherein the chassis has an assembling hole through which the connector is mounted to the chassis.

23. The lighting device according to claim 1, wherein the connector includes a connector housing having an insulating property and configured to house the connection terminal therein.

24. The lighting device according to claim 23, wherein:
the connector housing is made of a synthetic resin; and
the connection terminal is inserted into the connector housing.

25. The lighting device according to claim 1, further comprising a pair of reflection members, wherein:
the light source and the end portion of the light guide member that faces the light source are arranged so as to be spaced from each other with having a space therebetween; and
the reflection members are arranged to sandwich the space therebetween.

26. The lighting device according to claim 1, wherein the light source is an LED.

27. A display device comprising:
the lighting device according to claim 1; and
a display panel which carries out a display by utilizing light from the lighting device.

28. The display device according to claim 27, wherein the display panel is a liquid crystal panel including liquid crystal sealed between a pair of substrates.

29. A television receiver comprising the display device according to claim 27.

* * * * *